United States Patent
Boku et al.

(10) Patent No.: US 6,519,094 B1
(45) Date of Patent: Feb. 11, 2003

(54) ZOOM LENS AND VIDEO CAMERA COMPRISING THE SAME

(75) Inventors: Kazutake Boku, Osaka (JP); Shuusuke Ono, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 63 days.

(21) Appl. No.: 09/856,991

(22) PCT Filed: Oct. 5, 2000

(86) PCT No.: PCT/JP00/06969

§ 371 (c)(1),
(2), (4) Date: May 30, 2001

(87) PCT Pub. No.: WO01/25833

PCT Pub. Date: Apr. 12, 2001

(30) Foreign Application Priority Data

Oct. 7, 1999 (JP) .......................................... 11-287139

(51) Int. Cl.⁷ .............................................. G02B 15/14
(52) U.S. Cl. ...................................... 359/687; 359/684
(58) Field of Search ................................ 359/687, 684

(56) References Cited

U.S. PATENT DOCUMENTS

| | | | | |
|---|---|---|---|---|
| 5,530,592 A | * | 6/1996 | Tochigi ...................... | 359/687 |
| 5,712,733 A | | 1/1998 | Mukaiya ..................... | 359/687 |
| 6,084,722 A | * | 7/2000 | Horiuchi .................... | 359/687 |
| 6,101,043 A | * | 8/2000 | Kohno et al. ............... | 359/687 |
| 6,104,547 A | * | 8/2000 | Nanba ........................ | 359/687 |

FOREIGN PATENT DOCUMENTS

| | | |
|---|---|---|
| EP | 566 073 | 10/1993 |
| EP | 595 153 | 5/1994 |
| JP | 4-242707 | 8/1992 |
| JP | 5-60974 | 3/1993 |
| JP | 5-297275 | 11/1993 |
| JP | 5-323193 | 12/1993 |
| JP | 7-199071 | 8/1995 |
| JP | 8-106046 | 4/1996 |
| JP | 8-304700 | 11/1996 |
| JP | 9-281393 | 10/1997 |
| JP | 9-311272 | 12/1997 |
| JP | 11-52241 | 2/1999 |
| JP | 11-337823 | 12/1999 |
| JP | 2000-171711 | 6/2000 |
| JP | 2000-171712 | 6/2000 |
| JP | 2000-221400 | 8/2000 |
| JP | 2000-227552 | 8/2000 |
| JP | 2000-249900 | 9/2000 |
| JP | 2000-314838 | 11/2000 |

* cited by examiner

*Primary Examiner*—Georgia Epps
*Assistant Examiner*—Mi Hasan
(74) *Attorney, Agent, or Firm*—Merchant & Gould, P.C.

(57) ABSTRACT

A zoom lens including a second, third and fourth lens groups (12, 13 and 14) wherein at least one surfaces of the first to fourth lens groups has an aspherical surface, wherein the following relations are satisfied:

$9.0 < f1/fw < 10.5$ $1.2 < |f2/fw| < 1.6$ $4.5 < f3/fw < 6.0$ $4.0 < f4/fw < 5.5$ where f1 is a composed focal length of the first lens group, f2 is a composed focal length of the second lens group, f3 is a composed focal length of the third lens group, f4 is a composed focal length of the fourth lens group, and fw is a composed focal length of the entire system at a wide-angle end. Thereby, a compact zoom lens having an excellent aberration performance and a high zoom ratio of 20 times or more can be realized.

29 Claims, 17 Drawing Sheets

ZOOM LENS AND VIDEO CAMERA COMPRISING THE SAME

TECHNICAL FIELD

The present invention relates to a zoom lens. More specifically, the present invention relates to an aspherical zoom lens that is suitably used for a video camera and has a zoom ratio of about 20 to 23 times, a brightness of an F number of 1.6, low cost and a long back focus.

BACKGROUND ART

In recent years, in the development of zoom lenses, in order to be competitive in the market, it strongly has been demanded that a small size zoom lens having a high resolution power while having a variable power action is realized at low cost. In other words, it is necessary to provide a zoom lens with a high magnification and high resolution power in which the number of lenses to be used is as small as possible. A high magnification zooming is proposed in, for example, JP 8(1996)-106046 A, JP 9(1997)-311272 A. JP 8(1996)-106046 A discloses a zoom lens including ten lenses, four of which are plastic lenses, thereby realizing a zoom ratio of about 12 times. Furthermore, JP 9(1997)-311272 A describes a zoom lens including ten lenses, five of which are plastic lenses, thereby realizing a zoom ratio of about 18 times.

However, in a zoom lens having a zoom ratio of about 20 times or more, if a plastic lens is employed, it is necessary to correct the change in the refractive index due to the temperature change of plastic materials, resulting in the increase of the full length of the zoom lens.

DISCLOSURE OF INVENTION

Therefore, with the foregoing in mind, it is an object of the present invention to provide a compact and high function zoom lens with a brightness of an F number of 1.6 and with a high zoom ratio of about 20 times or more by providing a lens surface with an optimal power arrangement and an appropriate aspheric effect, and a video camera using the same.

In order to achieve the above-mentioned object, the first zoom lens of the present invention includes a first lens group having a positive refracting power that is fixed, a second lens group having a negative refracting power and varying power by moving along an optical axis, a third lens group having a positive refracting power that is fixed, and a fourth lens group having a positive refracting power and moving along the optical axis so that it keeps an image plane following up the movement of the second lens group and the object at a constant position with respect to the standard plane, the first, second, third and fourth lens groups being disposed from the side near the object to the side far away from the object in this order; wherein the first lens group includes a negative lens, a positive lens, and a positive lens having a convex surface facing the object side being disposed from the object side in this order; the second lens group includes a negative lens and a cemented lens of a negative lens and a positive lens in which the negative lens is located at the object side being disposed from the object side in this order, wherein at least one surface of the lenses is an aspherical surface; the third lens group includes a positive lens and a negative meniscus lens having a convex surface facing the object side being disposed from the object side in this order, wherein at least one surface of the lenses is an aspherical surface, and the fourth lens group includes a cemented lens of a negative lens and a positive lens in which the negative lens is located at the object side, wherein at least one surface of the lens has an aspherical surface; and the following relationships are satisfied:

$9.0 < f1/fw < 10.5$ $1.2 < |f2/fw| < 1.6$ $4.5 < f3/fw < 6.0$ $4.0 < f4/fw < 5.5$ where f1 is a composed focal length of the first lens group, f2 is a composed focal length of the second lens group, f3 is a composed focal length of the third lens group, f4 is a composed focal length of the fourth lens group, and fw is a composed focal length of the entire system at a wide-angle end. According to such a zoom lens, it is possible to form a compact zoom lens with an excellent aberration performance and a high magnification of 20 times or more. Furthermore, since an amount of movement at the time of zooming of the second lens group can be suppressed, it is possible to reduce the electric power consumption and to prevent the battery drive time from being shortened.

In the above-mentioned first zoom lens, it is preferable that an aspherical lens of the second lens group satisfies a relationship:

$0.6 < r21/r29 < 1.3$, where r21 is a local radius of curvature in a diameter corresponding to 10% of the lens effective diameter and r29 is a local radius of curvature in a diameter corresponding to 90% of the lens effective diameter. According to such a zoom lens, satisfactory aberration performance to provide the high resolution can be obtained.

Furthermore, it is preferable that an aspherical lens of the third lens group satisfies a relationship:

$0.3 < r31/r39 < 1.9$, where r31 is a local radius of curvature in a diameter corresponding to 10% of the lens effective diameter and r39 is a local radius of curvature in a diameter corresponding to 90% of the lens effective diameter. According to such a zoom lens, satisfactory aberration performance to provide the high resolution can be obtained.

Furthermore, in the above-mentioned first zoom lens, it is preferable that an aspherical lens of the fourth lens group satisfies a relationship:

$0.5 < r41/r49 < 1.1$, where r41 is a local radius of curvature in a diameter corresponding to 10% of the lens effective diameter and r49 is a local radius of curvature in a diameter corresponding to 90% of the lens effective diameter. According to such a zoom lens, satisfactory aberration performance to provide the high resolution can be obtained.

Furthermore, it is preferable that the following relationship is satisfied:

$0.8 < BF/fw < 1.7$, where fw is a composed focal length of the entire system at a wide-angle end and BF is an air distance between the zoom surface of lens and the image plane. According to such a zoom lens, it is possible to ensure a satisfactory back-focus enabling a low-pass filter such as a crystal filter, an IR cut filter, and the like to be inserted. Furthermore, since the back-focus does not become unnecessarily large, a compact zoom lens can be realized.

Furthermore, it is preferable that a radius of curvature of the surface of a lens disposed closest to the image plane side in the first lens group and a radius, of curvature of the surface of a lens disposed closest to the object side in the second lens group have the same value. According to such a zoom lens, it is possible to prevent the distance between the surface disposed closest to the image plane side of the first lens group and the surface disposed closest to the object side of the second lens group from being reduced, and therefore a lens barrel can be formed easily.

Furthermore, it is preferable that the negative lens of the cemented lens of the second lens group satisfies a relationship:

$$|\{sag\ (r1) - sag\ (r2) - d8\}/d8| < 4.5$$

where sag (r1) denotes a sag amount between the center of the lens on the incident surface of the negative lens of the cemented lens and the position where the incident surface of the negative lens of the cemented lens is brought into contact with the outgoing surface of the negative lens disposed closest to the object side of the second lens group; sag (r2) denotes a sag amount between the center of the lens and the outer-most peripheral portion on the outgoing surface on the negative lens of the cemented lens; and d8 denotes a thickness of a lens. According to such a zoom lens, a biconcave lens can be formed easily, suitably improving the yield.

Next, the second zoom lens of the present invention includes a first lens group having a positive refracting power that is fixed, a second lens group having a negative refracting power and varying power by moving along an optical axis, a third lens group having a positive refracting power that is fixed, and a fourth lens group having a positive refracting power and moving along the optical axis so that it keeps an image plane following up the movement of the second lens group and the object at a constant position with respect to the standard plane, the first, second, third and fourth lens groups being disposed from the side near the object to the side far away from the object in this order; wherein the first lens group includes a negative lens, a positive lens, and a positive lens having a convex surface facing the object side being disposed from the object side in this order; the second lens group includes a negative lens and a cemented lens of a negative lens and a positive lens in which the negative lens is located at the object side being disposed from the object side in this order, wherein at least one surface of the lenses is an aspherical surface; the third lens group includes a positive lens and a negative meniscus lens having a convex surface facing the object side being disposed from the object side in this order, wherein at least one surface of the lenses is an aspherical surface, and the fourth lens group includes a cemented lens of a positive lens and a negative lens in which the positive lens is located at the object side, wherein at least one surface of the lens has an aspherical surface; and the following relationships are satisfied:

$$9.0 < f1/fw < 10.5$$

$$1.2 < |f2/fw| < 1.6$$

$$4.5 < f3/fw < 6.0$$

$$4.0 < f4/fw < 5.5$$

where f1 is a composed focal length of the first lens group, f2 is a composed focal length of the second lens group, f3 is a composed focal length of the third lens group, f4 is a composed focal length of the third lens group, and fw is a composed focal length of the entire system at a wide-angle end. According to such a zoom lens, it is possible to form a compact zoom lens with an excellent aberration performance and a high magnification of 20 times or more. Furthermore, since an amount of movement at the time of zooming of the second lens group can be suppressed, it is possible to reduce the electric power consumption and to prevent the battery drive time from being shortened.

$$0.6 < r21/r29 < 1.3,$$

where r21 is a local radius of curvature in a diameter corresponding to 10% of the lens effective diameter and r29 is a local radius of curvature in a diameter corresponding to 90% of the lens effective diameter. According to such a zoom lens, satisfactory aberration performance to provide the high resolution can be obtained.

Furthermore, it is preferable that an aspherical lens of the third lens group satisfies a relationship:

$$0.3 < r31/r39 < 1.9,$$

where r31 is a local radius of curvature in a diameter corresponding to 10% of the lens effective diameter and r39 is a local radius of curvature in a diameter corresponding to 90% of the lens effective diameter. According to such a zoom lens, satisfactory aberration performance to provide the high resolution can be obtained.

Furthermore, in the above-mentioned first zoom lens, it is preferable that an aspherical lens of the fourth lens group satisfies a relationship:

$$0.5 < r41/r49 < 1.1,$$

where r41 is a local radius of curvature in a diameter corresponding to 10% of the lens effective diameter and r49 is a local radius of curvature in a diameter corresponding to 90% of the lens effective diameter. According to such a zoom lens, satisfactory aberration performance to provide the high resolution can be obtained.

Furthermore, it is preferable that the following relationship is satisfied:

$$0.8 < BF/fw < 1.7,$$

where fw is a composed focal length of the entire system at a wide-angle end and BF is an air distance between the zoom surface of lens and the image plane. According to such a zoom lens, it is possible to ensure a-satisfactory back-focus enabling a low-pass filter such as a crystal filter, an IR cut filter, and the like to be inserted. Furthermore, since the back-focus does not become unnecessarily large, a compact zoom lens can be realized.

Furthermore, it is preferable that a radius of curvature of the surface of a lens disposed closest to the image plane side in the first lens group and a radius of curvature of the surface of a lens disposed closest to the object side in the second lens group have the same value. According to such a zoom lens, it is possible to prevent the distance between the surface disposed closest to the image plane side of the first lens group and the surface disposed closest to the object side of the second lens group from being reduced, and therefore a lens barrel can be formed easily.

Furthermore, it is preferable that the negative lens of the cemented lens of the second lens group satisfies a relationship:

$$|\{sag(r1)-sag(r2)-d8\}/d8|<4.5$$

where sag (r1) denotes a sag amount between the center of the lens on the incident surface of the negative lens of the cemented lens and the position where the incident surface of the negative lens of the cemented lens is brought into contact with the outgoing surface of the negative lens disposed closest to the object side of the second lens group; sag (r2) denotes a sag amount between the center of the lens and the outer-most peripheral portion on the outgoing surface on the negative lens of the cemented lens; and d8 denotes a thickness of a lens. According to such a zoom lens, a biconcave lens can be formed easily, suitably improving the yield.

Next, the third zoom lens of the present invention includes a first lens group having a positive refracting power that is fixed, a second lens group having a negative refracting power and varying power by moving along an optical axis, a third lens group having a positive refracting power that is fixed, and a fourth lens group having a positive refracting power and moving along the optical axis so that it keeps an image plane following up the movement of the second lens group and the object at a constant position with respect to the standard plane, the first, second, third and fourth lens groups being disposed from the side near the object to the side far away from the object in this order; wherein the first lens group includes a negative lens, a positive lens, and a positive lens having a convex surface facing the object side being disposed from the object side in this order; the second lens group includes a negative lens and a cemented lens of a negative lens and a positive lens in which the negative lens is located at the object side being disposed from the object side in this order, wherein at least one surface of the lenses is an aspherical surface; the third lens group includes a positive lens and a negative lens having a concave surface facing the object side being disposed from the object side in this order, wherein at least one surface of the lenses is an aspherical surface, and the fourth lens group includes a cemented lens of a negative lens and a positive lens in which the negative lens is located at the object side, wherein at least one surface of the lens has an aspherical surface; and the following relationships are satisfied:

$$9.0<f1/fw<10.5$$

$$1.2<|f2/fw|<1.6$$

$$4.5<f3/fw<6.0$$

$$4.0<f4/fw<5.5$$

where f1 is a composed focal length of the first lens group, f2 is a composed focal length of the second lens group, f3 is a composed focal length of the third lens group, f4 is a composed focal length of the fourth lens group, and fw is a composed focal length of the entire system at a wide-angle end. According to such a zoom lens, it is possible to form a compact zoom lens with an excellent aberration performance and a high magnification of 20 times or more. Furthermore, since an amount of movement at the time of zooming of the second lens group can be suppressed, it is possible to reduce the electric power consumption and to prevent the battery drive time from being shortened.

In the above-mentioned third zoom lens, it is preferable that an aspherical lens of the second lens group satisfies a relationship:

$$0.6<r21/r29<1.3,$$

where r21 is a local radius of curvature in a diameter corresponding to 10% of the lens effective diameter and r29 is a local radius of curvature in a diameter corresponding to 90% of the lens effective diameter. According to such a zoom lens, satisfactory aberration performance to provide the high resolution can be obtained.

Furthermore, it is preferable that an aspherical lens of the third lens group satisfies a relationship:

$$0.3<r31/r39<1.9,$$

where r31 is a local radius of curvature in a diameter corresponding to 10% of the lens effective diameter and r39 is a local radius of curvature in a diameter corresponding to 90% of the lens effective diameter. According to such a zoom lens, satisfactory aberration performance to provide the high resolution can be obtained.

Furthermore, in the above-mentioned first zoom lens, it is preferable that an aspherical lens of the fourth lens group satisfies a relationship:

$$0.5<r41/r49<1.1,$$

where r41 is a local radius of curvature in a diameter corresponding to 10% of the lens effective diameter and r49 is a local radius of curvature in a diameter corresponding to 90% of the lens effective diameter. According to such a zoom lens, satisfactory aberration performance to provide the high resolution can be obtained.

Furthermore, it is preferable that the following relationship is satisfied:

$$0.8<BF/fw<1.7,$$

where fw is a composed focal length of the entire system at a wide-angle end and BF is an air distance between the zoom surface of lens and the image plane. According to such a zoom lens, it is possible to ensure a satisfactory back-focus enabling a low-pass filter such as a crystal filter, an IR cut filter, and the like to be inserted. Furthermore, since the back-focus does not become unnecessarily large, a compact zoom lens can be realized.

Furthermore, it is preferable that a radius of curvature of the surface of a lens disposed closest to the image plane side in the first lens group and a radius of curvature of the surface of a lens disposed closest to the object side in the second lens group have the same value. According to such a zoom lens, it is possible to prevent the distance between the surface disposed closest to the image plane side of the first lens group and the surface disposed closest to the object side of the second lens group from being reduced, and therefore a lens barrel can be formed easily.

Furthermore, it is preferable that the negative lens of the cemented lens of the second lens group satisfies a relationship:

$$|\{sag(r1)-sag(r2)-d8\}/d8|<4.5$$

where sag (r1) denotes a sag amount between the center of the lens on the incident surface of the negative lens of the cemented lens and the position where the incident surface the negative lens of the cemented lens is brought into contact with the outgoing surface of the negative lens disposed closest to the object side of the second lens group; sag (r2) denotes a sag amount between the center of the lens and the outer-most peripheral portion on the outgoing surface on the negative lens of the cemented lens; and d8 denotes a thickness of a lens. According to such a zoom lens, a biconcave lens can be formed easily, suitably improving the yield.

Next, the fourth zoom lens of the present invention includes a first lens group having a positive refracting power that is fixed, a second lens group having a negative refracting power and varying power by moving along an optical axis, a third lens group having a positive refracting power that is fixed, and a fourth lens group having a positive refracting power and moving along the optical axis so that it keeps an image plane following up the movement of the second lens group and the object at a constant position with respect to the standard plane, the first, second, third and fourth lens groups being disposed from the side near the object to the side far away from the object in this order; wherein the first lens group includes a negative lens, a positive lens, and a positive lens having a convex surface facing the object side being disposed from the object side in this order; the second lens group includes a negative lens and a cemented lens of a negative lens and a positive lens in which the negative lens is located at the object side being disposed from the object side in this order, wherein at least one surface of the lenses is an aspherical surface; the third lens group includes a positive lens having a convex surface facing the object side, a positive lens and a negative meniscus lens having a convex surface facing the object side being disposed from the object side in this order, wherein at least one surface of the lenses is an aspherical surface, and the fourth lens group includes a cemented lens of a negative lens and a positive lens in which the negative lens is located at the object side, wherein at least one surface of the lens has an aspherical surface; and the following relationships are satisfied:

$$9.0 < f1/fw < 10.5$$

$$1.2 < |f2/fw| < 1.6$$

$$4.5 < f3/fw < 6.0$$

$$4.0 < f4/fw < 5.5$$

where f1 is a composed focal length of the first lens group, f2 is a composed focal length of the second lens group, f3 is a composed focal length of the third lens group, f4 is a composed focal length of the fourth lens group, and fw is a composed focal length of the entire system at a wide-angle end. According to such a zoom lens, it is possible to form a compact zoom lens with an excellent aberration performance and a high magnification of 20 times or more. Furthermore, since an amount of movement at the time of zooming of the second lens group can be suppressed, it is possible to reduce the electric power consumption and to prevent the battery drive time from being shortened.

In the above-mentioned fourth zoom lens, it is preferable that an aspherical lens of the second lens group satisfies a relationship:

$$0.6 < r21/r29 < 1.3,$$

where r21 is a local radius of curvature in a diameter corresponding to 10% of the lens effective diameter and r29 is a local radius of curvature in a diameter corresponding to 90% of the lens effective diameter. According to such a zoom lens, satisfactory aberration performance to provide the high resolution can be obtained.

Furthermore, it is preferable that an aspherical lens of the third lens group satisfies a relationship:

$$0.3 < r31/r39 < 1.9,$$

where r31 is a local radius of curvature in a diameter corresponding to 10% of the lens effective diameter and r39 is a local radius of curvature in a diameter corresponding to 90% of the lens effective diameter. According to such a zoom lens, satisfactory aberration performance to provide the high resolution can be obtained.

Furthermore, in the above-mentioned first zoom lens, it is preferable that an aspherical lens of the fourth lens group satisfies a relationship:

$$0.5 < r41/r49 < 1.1,$$

where r41 is a local radius of curvature in a diameter corresponding to 10% of the lens effective diameter and r49 is a local radius of curvature in a diameter corresponding to 90% of the lens effective diameter. According to such a zoom lens, satisfactory aberration performance to provide the high resolution can be obtained.

Furthermore, it is preferable that the following relationship is satisfied:

$$0.8 < BF/fw < 1.7,$$

where fw is a composed focal length of the entire system at a wide-angle end and BF is an air distance between the zoom surface of lens and the image plane. According to such a zoom lens, it is possible to ensure a satisfactory back-focus enabling a low-pass filter such as a crystal filter, an IR cut filter, and the like to be inserted. Furthermore, since the back-focus does not become unnecessarily large, a compact zoom lens can be realized.

Furthermore, it is preferable that a radius of curvature of the surface of a lens disposed closest to the image plane side in the first lens group and a radius of curvature of the surface of a lens disposed closest to the object side in the second lens group have the same value. According to such a zoom lens, it is possible to prevent the distance between the surface disposed closest to the image plane side of the first lens group and the surface disposed closest to the object side of the second lens group from being reduced, and therefore a lens barrel can be formed easily.

Furthermore, it is preferable that the negative lens of the cemented lens of the second lens group satisfies a relationship:

$$|\{sag(r1)-sag(r2)-d8\}/d8| < 4.5$$

where sag (r1) denotes a sag amount between the center of the lens on the incident surface of the negative lens of the cemented lens and the position where the incident surface the negative lens of the cemented lens is brought into contact with the outgoing surface of the negative lens disposed closest to the object side of the second lens group; sag (r2) denotes a sag amount between the center of the lens and the outer-most peripheral portion on the outgoing surface on the negative lens of the cemented lens; and d8 denotes a thickness of a lens. According to such a zoom lens, a biconcave lens can be formed easily, suitably improving the yield.

Next, the video camera of the present invention uses the above-mentioned zoom lenses. According to such a video camera, a compact, light and low cost video camera can be realized.

BEST MODE FOR CARRYING OUT THE INVENTION

Hereinafter, the present invention will be explained in detail by way of embodiments with reference to drawings.

FIRST EMBODIMENT

Figure 1:
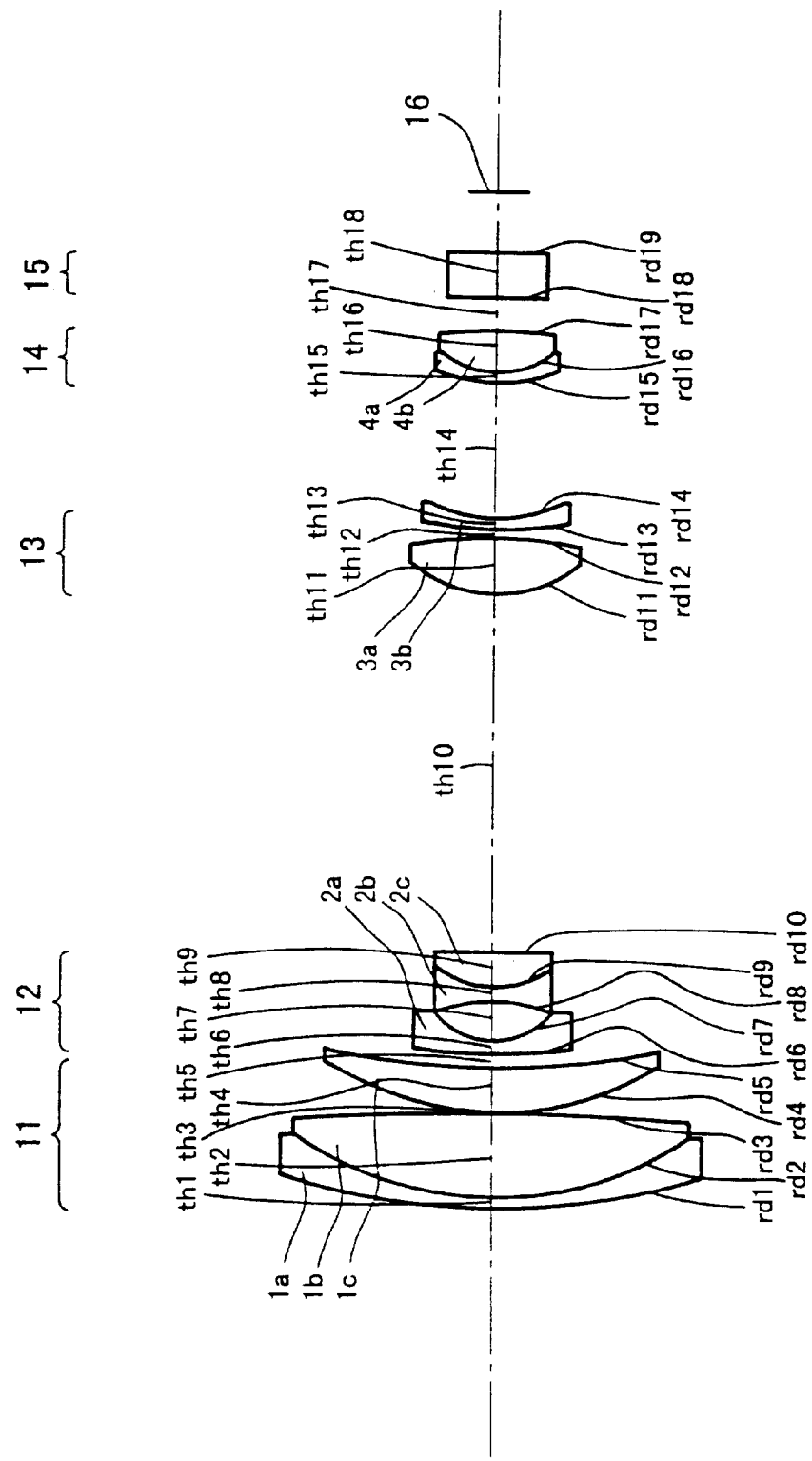
FIG. 1 is a view showing a configuration of a zoom lens according to a first embodiment of the present invention.

FIG. 1 is a view showing a configuration of a zoom lens according to a first embodiment. As shown in FIG. 1, a zoom lens has a configuration in which a first lens group 11, a second lens group 12, a third lens group 13, a fourth lens group 14, and a plate glass 15 are disposed from an object side (left side in FIG. 1) to an image plane 16 side (right side in FIG. 1) in this order. The plate glass 15 is optically equivalent to a crystal filter, a face plate of an image pick-up device, or the like.

The first lens group 11 has a positive refracting power, and is fixed with respect to the image plane 16 even in varying power and focusing. The second lens group 12 has a negative refracting power and varies power by moving along an optical axis. The third lens group 13 has a positive refracting power and is fixed with respect to the image plane 16 even in varying power and focusing. The fourth lens group 14 has a positive refracting power, and moves on the optical axis so that it keeps the image plane 16 following up the movement of the second lens group 12 and the object at a constant position with respect to the standard plane, thereby carrying out moving of an image due to a variable power and adjusting the focus at the same time.

The first lens group 11 includes a negative lens 1a, a positive lens 1b, and a positive lens 1c having a convex surface facing the object side, disposed from the object side in this order. The second lens group 12 includes a negative lens 2a and a cemented lens of a biconcave lens 2b and a positive lens 2c, disposed from the object side in this order, in which at least one surface of the lenses is an aspherical surface. The third lens group 13 includes a positive lens 3a and a negative meniscus lens 3b having a convex surface facing the object side, disposed from the object side in this order, in which at least one surface of the lenses is an aspherical surface. The fourth lens group 14 includes a cemented lens of a negative lens 4a and a positive lens 4b, disposed from the object side in this order, in which at least one surface of the lens has an aspherical surface.

Furthermore, in the zoom lens of this embodiment, the following expressions (1) to (4) are satisfied:

$$9.0 < f1/fw < 10.5$$

$$1.2 < |f2/fw| < 1.6$$

$$4.5 < f3/fw < 6.0$$

$$4.0 < f4/fw < 5.5$$

where f1 is a composed focal length of the first lens group 11, f2 is a composed focal length of the second lens group 12, f3 is a composed focal length of the third lens group 13, f4 is a composed focal length of the fourth lens group 14, and fw is a composed focal length of the entire system at a wide-angle end.

The expression (1) is a conditional expression relating to the refracting power of the first lens group 11. If f1/fw is less than the lower limit of the expression (1), the refracting power of the first lens group 11 is increased, which makes it difficult to correct a spherical aberration at the side of the long focal length, in particular in the range where the focal length of 18 times or more and an off-axis coma-aberration. As a result, the high performance of the zoom lens cannot be achieved. On the other hand, if f1/fw is more than the upper limit of the expression (1), the full length of the lens becomes longer than necessary, which makes it impossible to realize a compact zoom lens. Also, a movement amount of the second lens group 12 in zooming becomes large, which increases the electric power consumption and thus shortens the drive time of the battery.

The expression (2) is a conditional expression relating to the refracting power of the second lens group 12. If |f2/fw| is less than the lower limit of the expression (2), the Petzval sum of the entire system becomes large, so that a curvature of the image plane cannot be corrected. Consequently, the focus location of a meridional image plane differs from that of a sagittal image plane, and therefore high performance of the zoom lens cannot be achieved. On the other hand, if |f2/fw| is more than the upper limit of the expression (2), the Petzval sum becomes small and thus excellent performance can be obtained. However, the full length of the lens becomes longer than necessary, which makes it impossible to realize a compact zoom lens. And an amount of the movement of the second lens group 12 in zooming is large, which increases the electric power consumption, and consequently the drive time of the battery is reduced.

The expression (3) is a conditional expression relating to the refracting power of the third lens group 13. If f3/fw is less than the lower limit of the expression (3), the refracting power of the third lens group 13 is increased, which makes it impossible to ensure a back-focus enabling a crystal filter, etc. to be inserted and makes it difficult to correct a spherical aberration. On the other hand, if f3/fw is more than the upper limit of expression (3), the Petzval sum becomes large and thus the image curvature cannot be corrected. Consequently, the focus location of the meridional image plane differs from that of the sagittal image plane, and therefore high performance of the zoom lens cannot be achieved.

The expression (4) is a conditional expression relating to the refracting power of the fourth lens group 14. If f4/fw is less than the lower limit of expression (4), it is difficult to correct off-axis aberrations both in near photographing and in long-distance photographing at the same time. On the other hand, if f4/fw is more than the upper limit of the expression (4), the back focus becomes unnecessarily large, and thus a compact zoom lens cannot be realized.

Furthermore, in the zoom lens of this embodiment, the following conditional expressions are satisfied:

$$0.6 < r21/r29 < 1.3 \quad (5)$$

$$0.3 < r31/r39 < 1.9 \quad (6)$$

$$0.5 < r41/r49 < 1.1 \quad (7)$$

where r21 is a local radius of curvature in a diameter corresponding to 10% of the lens effective diameter and r29 is a local radius of curvature in a diameter corresponding to 90% of the lens effective diameter in an aspherical lens of the second lens group 12; r31 is a local radius of curvature in a diameter corresponding to 10% of the lens effective diameter and r39 is a local radius of curvature in a diameter corresponding to 90% of the lens effective diameter in an aspherical lens of the third lens group 13; and r41 is a local radius of curvature in a diameter corresponding to 10% of the lens effective diameter and r49 is a local radius of curvature in a diameter corresponding to 90% of the lens effective diameter in an aspherical lens of the fourth lens group 14.

If these conditional expressions are satisfied, it is possible to obtain a satisfactory aberration performance to realize a high resolution zoom lens.

The expression (5) is a conditional expression relating to an amount of an aspherical surface of the aspherical lens of the second lens group 12. When r21/r29 is less than the lower limit of the expression (5), an aspherical aberration cannot be corrected satisfactorily, and thus the satisfactory aberration performance cannot be obtained. On the other hand, when r21/r29 is more than the upper limit of the expression (5), an aspherical aberration cannot be corrected satisfactorily, in particular in near photographing, and thus the satisfactory aberration performance cannot be obtained.

The expression (6) is a conditional expression relating to an amount of aspherical surface of an aspherical lens of the third lens group 13. When r31/r39 is less than the lower limit of the expression (6), an aspherical aberration cannot be corrected satisfactorily, and thus the satisfactory aberration performance cannot be obtained. On the other hand, when r31/r39 is more than the upper limit of the expression (6), excess correction is performed and a coma flare is likely to occur.

The expression (7) is a conditional expression relating to an amount of aspherical surface of an aspherical lens of the fourth lens group 14. When r41/r49 is less than the lower limit of the expression (7) or is more than the upper limit of the expression (7), a total balance of aberration between a wide-angle end and a telephoto end is lost, and thus the satisfactory aberration performance cannot be obtained.

Furthermore, in the zoom lens of this embodiment, the following expression (8) is satisfied:

$$0.8 < BF/fw < 1.7 \quad (8)$$

where fw is a composed focal length of the entire system at a wide-angle end and BF is an air distance between the end surface of the lens and the image plane 16.

If the above-mentioned expression (8) is satisfied, it is possible to ensure a satisfactory back-focus enabling a low-pass filter such as an IR cut filter, a crystal filter, and the like to be inserted. When BF/fw is less than the lower limit of the expression (8), it is not possible to ensure a satisfactory space enabling a low-pass filter such as an IR cut filter, a crystal filter, and the like to be inserted. On the other hand, when BF/fw is more than the upper limit of the expression (8), the back focus becomes unnecessarily large, and thus a compact zoom lens cannot be realized.

Furthermore, in the zoom lens of this embodiment, a radius of curvature of the surface disposed closest to the image plane side of the first lens group 11 and a radius of curvature of a surface disposed closest to the object side of the second lens group 12 have the same value. Thereby, it is possible to prevent the distance between the surface disposed closest to the image plane side of the first lens group 11 and the surface disposed closest to the object side of the second lens group 12 from being reduced. Thus, a lens barrel can be formed easily.

Furthermore, in the zoom lens of this embodiment, the following expression (9) is satisfied;

$$|\{\text{sag}(r1) - \text{sag}(r2) - d8\}/d8| < 4.5 \quad (9)$$

where sag (r1) denotes a sag amount between the center of the lens on the incident surface of the negative lens of the cemented lens and the position where the incident surface of the negative lens of the cemented lens is brought into contact with the outgoing surface of the negative lens disposed closest to the object side of the second lens group; sag (r2) denotes a sag amount between the center of the lens and the outermost peripheral portion on the outgoing surface on the negative lens of the cemented lens; and d8 denotes a thickness of a lens.

If this expression (9) is satisfied, a biconcave lens can be formed easily, thus suitably improving the yield. The expression (9) is a conditional expression relating to an eccentricity of a wall thickness. If |{sag(r1)−sag(r2)−d8}/d8 | is more than the upper limit of the conditional expression (9), the ratio of a wall thickness of the central portion of the lens to an edge thickness of the peripheral portion is increased, thus making it difficult to mold a lens. As a result, the yield is lowered and a low cost of lenses cannot be realized.

EXAMPLE 1

The following Table 1 shows an example of the zoom lens in the first embodiment. In Table 1, rd (mm) is a radius of curvature of a lens, th (mm) is a wall thickness of a lens or an air distance between lenses, nd is a refractive index of each lens with respect to a d-line, and ν is an abbe number of each lens with respect to the d-line. Furthermore, the shape of an aspherical surface (in Table 1, mark * is given to the numbers of the surfaces) is defined by the following equation (10). This also applies to the below mentioned Examples 2 to 4.

$$Z=[cy^2/[1+\{1-(1+k)c^2y^2\}^{1/2}]]+Dy^4+Ey^6+Fy^8+Gy^{10} \quad (10)$$

wherein

Z: a distance from a surface contacting the apex on the aspherical surface to the lens at a height y from the optical axis y: a height from an optical axis c: a radius of curvature at the apex on the aspherical surface k: conical constant D, E, F, G: aspherical coefficients

TABLE 1

| Group | Surface | rd | th | nd | υ |
|---|---|---|---|---|---|
| 1 | 1 | 39.11 | 0.80 | 1.80518 | 25.4 |
|  | 2 | 20.45 | 5.00 | 1.58913 | 61.2 |
|  | 3 | −195.14 | 0.15 |  |  |
|  | 4 | 18.87 | 2.80 | 1.60311 | 60.7 |
|  | 5 | 51.40 | variable |  |  |
| 2 | 6 | 51.40 | 0.60 | 1.80500 | 39.6 |
|  | 7 | 4.32 | 2.62 |  |  |
|  | 8* | −9.02 | 0.80 | 1.60602 | 57.8 |
|  | 9 | 5.30 | 2.10 | 1.80518 | 25.5 |
|  | 10 | 55.17 | variable |  |  |
| 3 | 11* | 7.44 | 3.45 | 1.60602 | 57.8 |
|  | 12* | −17.74 | 0.45 |  |  |
|  | 13 | 25.09 | 0.60 | 1.80518 | 25.5 |
|  | 14 | 8.03 | variable |  |  |
| 4 | 15 | 9.86 | 0.60 | 1.68893 | 31.2 |
|  | 16 | 5.19 | 2.55 | 1.60602 | 57.8 |
|  | 17* | −30.85 | variable |  |  |
| 5 | 18 | ∞ | 2.80 | 1.51633 | 64.1 |
|  | 19 | ∞ | — |  |  |

The following Table 2 shows aspherical coefficients of the zoom lens in the examples shown in Table 1.

TABLE 2

| Surface | K | D | E | F | G |
|---|---|---|---|---|---|
| 8 | −5.60320 | −8.42949 × 10⁻⁴ | −6.22297 × 10⁻⁶ | 0.0 | 0.0 |
| 11 | 0.16411 | −3.65163 × 10⁻⁴ | 8.68619 × 10⁻⁷ | 0.0 | 0.0 |
| 12 | 2.79962 | 3.13877 × 10⁻⁴ | 6.21387 × 10⁻⁶ | 0.0 | 0.0 |
| 17 | −70.38210 | −1.39134 × 10⁻⁴ | 4.91233 × 10⁻⁶ | 0.0 | 0.0 |

The following Table 3 shows an air distance (mm) that can be varied by zooming when an object is positioned 2 m away. The standard position is a position where the third lens group 13 is placed the closest to the fourth lens group 14. FNo. denotes an F number and ω(°) denotes a incident view of angle Table 3 shows a focal length (mm), FNo., angle of view at a wide-angle end, a standard position, and a telephoto end of the zoom lens.

TABLE 3

|  | wide-angle end | standard position | telephoto end |
|---|---|---|---|
| focal length | 3.010 | 31.416 | 66.285 |
| F No. | 1.668 | 2.425 | 2.996 |
| angle of view(2 ω) | 64.740 | 6.463 | 3.118 |
| th5 | 0.700 | 17.518 | 20.448 |
| th10 | 21.740 | 4.922 | 1.992 |
| th12 | 8.3148 | 2.178 | 6.026 |
| th17 | 2.005 | 8.172 | 4.294 |

The following are values of the above-mentioned expressions (1) to (9).

Figure 2:
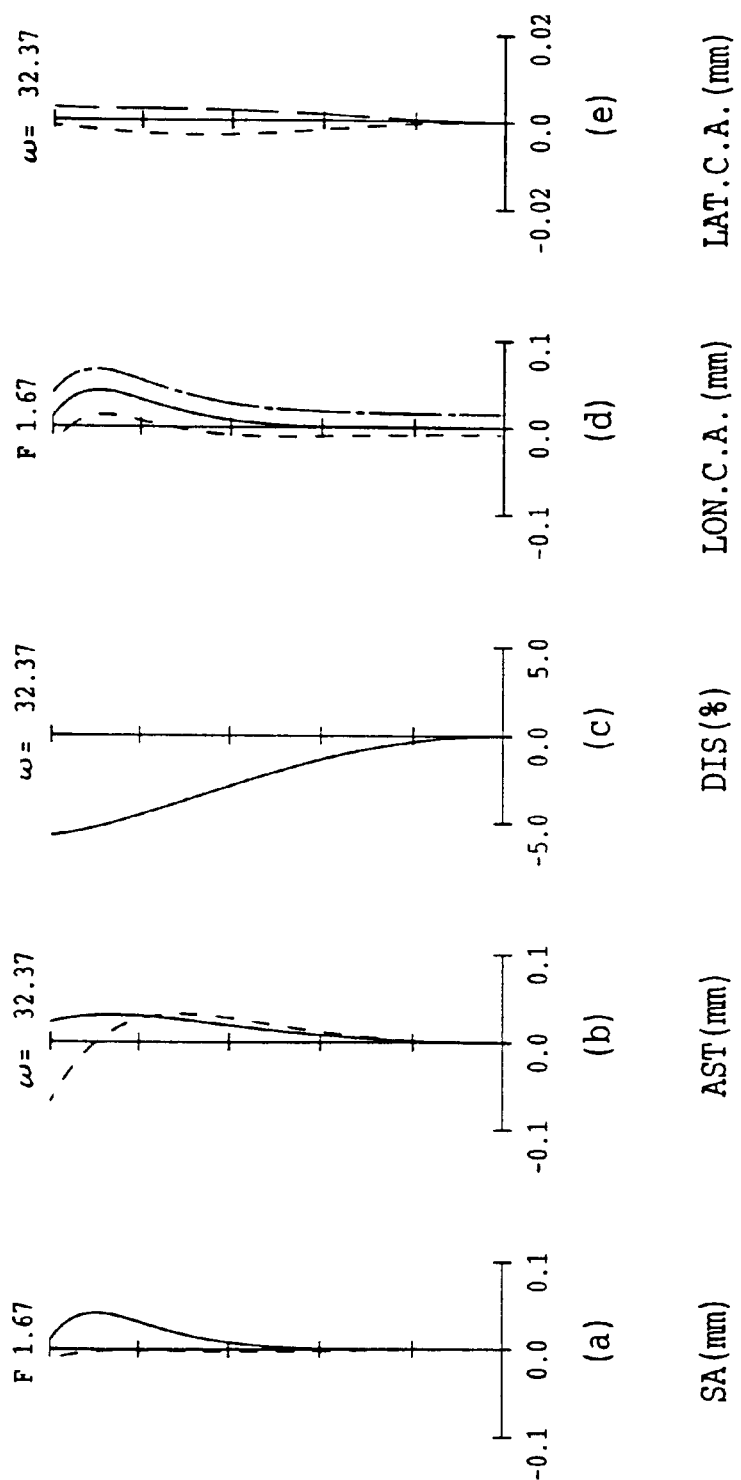
FIG. 2 illustrates various aberration performance at a wide-angle end of the zoom lens according to the first embodiment of the present invention.
Figure 3:
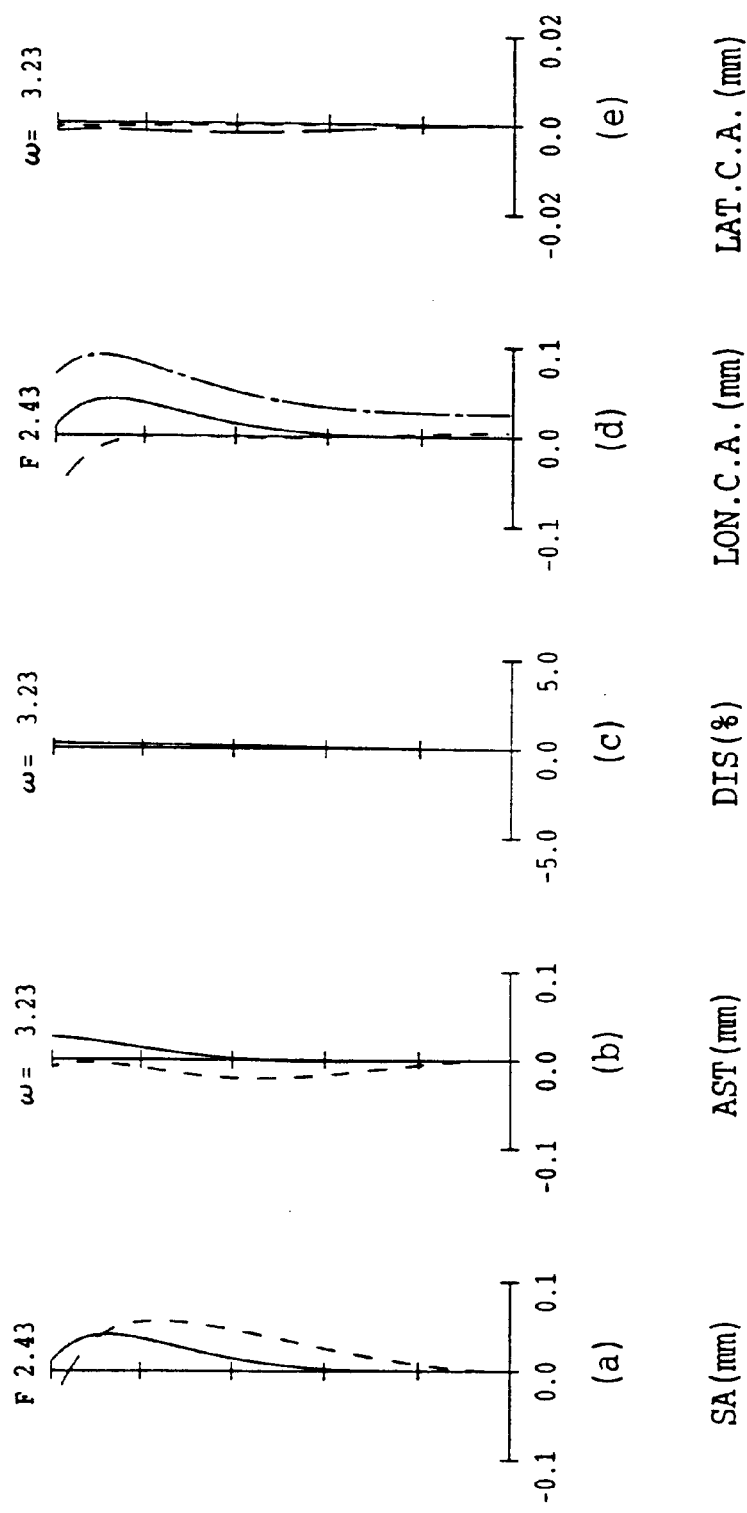
FIG. 3 illustrates various aberration performance at the standard position of the zoom lens according to the first embodiment of the present invention.
Figure 4:
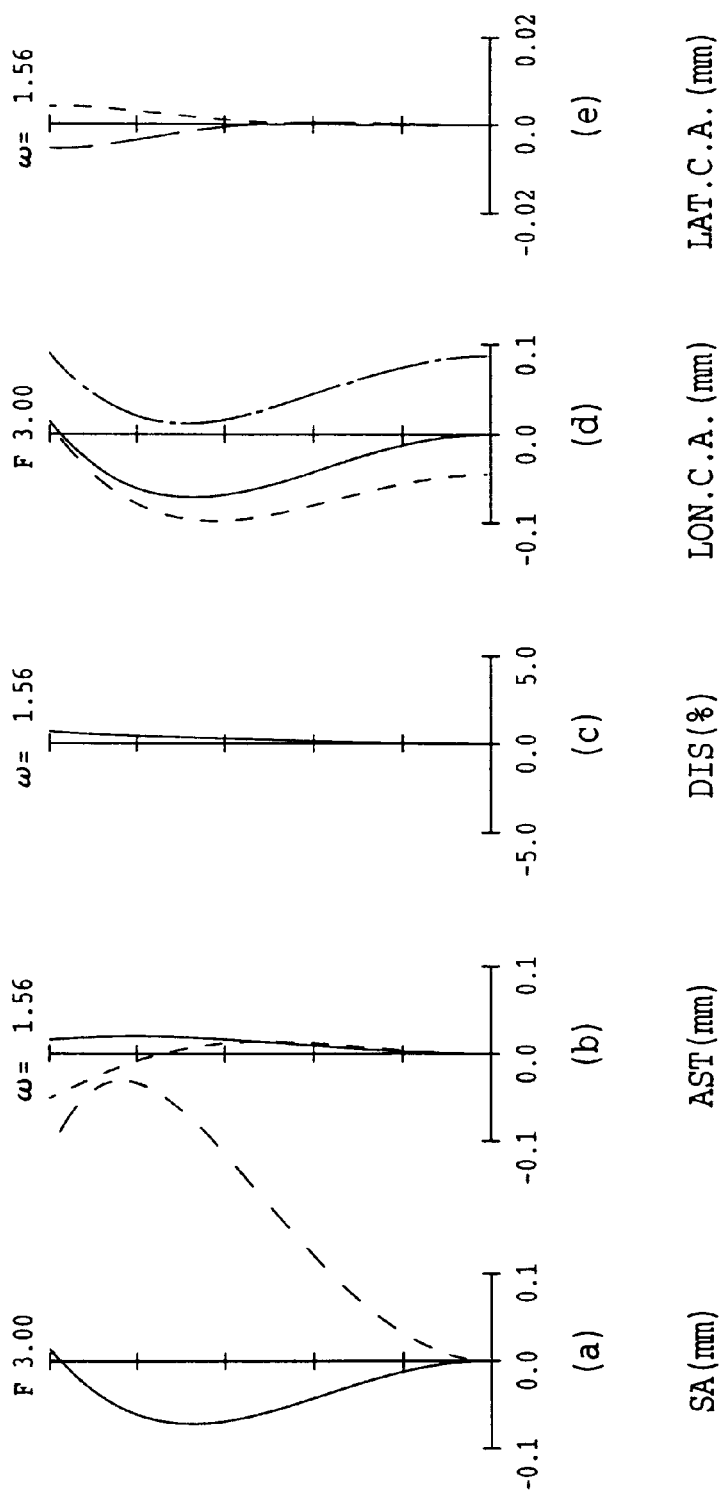
FIG. 4 illustrates various aberration performance at a telephoto end of the zoom lens according to the first embodiment of the present invention.

$f1/fw=9.987$ $|f2/fw|=1.420$ $f3/fw5.422$ $f4/fw=4.629$ $r21/r29 =1.041$ $r31/r39=0.53$ $r41/r49=0.878$ $BF/fw=1.2$ $|\{sag(r1)-sag(r2)-d8\}/d8=3.41$ FIGS. 2 to 4 show various aberrations at the wide-angle end (FIG. 2), the standard position (FIG. 2), and the telephoto end (FIG. 4) of the zoom lens shown in Example 1. In each aberration, (a) shows a spherical aberration (mm); (b) shows astigmatism (mm); (c) shows a distortion aberration (%); (d) shows a longitudinal chromatic aberration (mm); and (e) shows a chromatic aberration of magnification (mm). In the spherical aberration of FIG. 2(a), a solid line represents a spherical aberration, and a broken line represents a sine condition. In the astigmatism of FIG. 2(b), a solid line represents a curvature of a sagittal image plane, and a broken line represents a curvature of a meridional image plane. In the longitudinal chromatic aberration of FIG. 2(d), a solid line represents values with respect to the d-line, a short broken line represents values with respect to an F-line, and a long broken line represents values with respect to a C-line. As is apparent from these aberrations, the zoom lens of Example 1 has an excellent aberration performance.

The explanations of the above-mentioned (a) to (e) in the above also apply to the following FIGS. 6 to 8, FIGS. 10 to 12, and FIGS. 14 to 16.

SECOND EMBODIMENT

Figure 5:
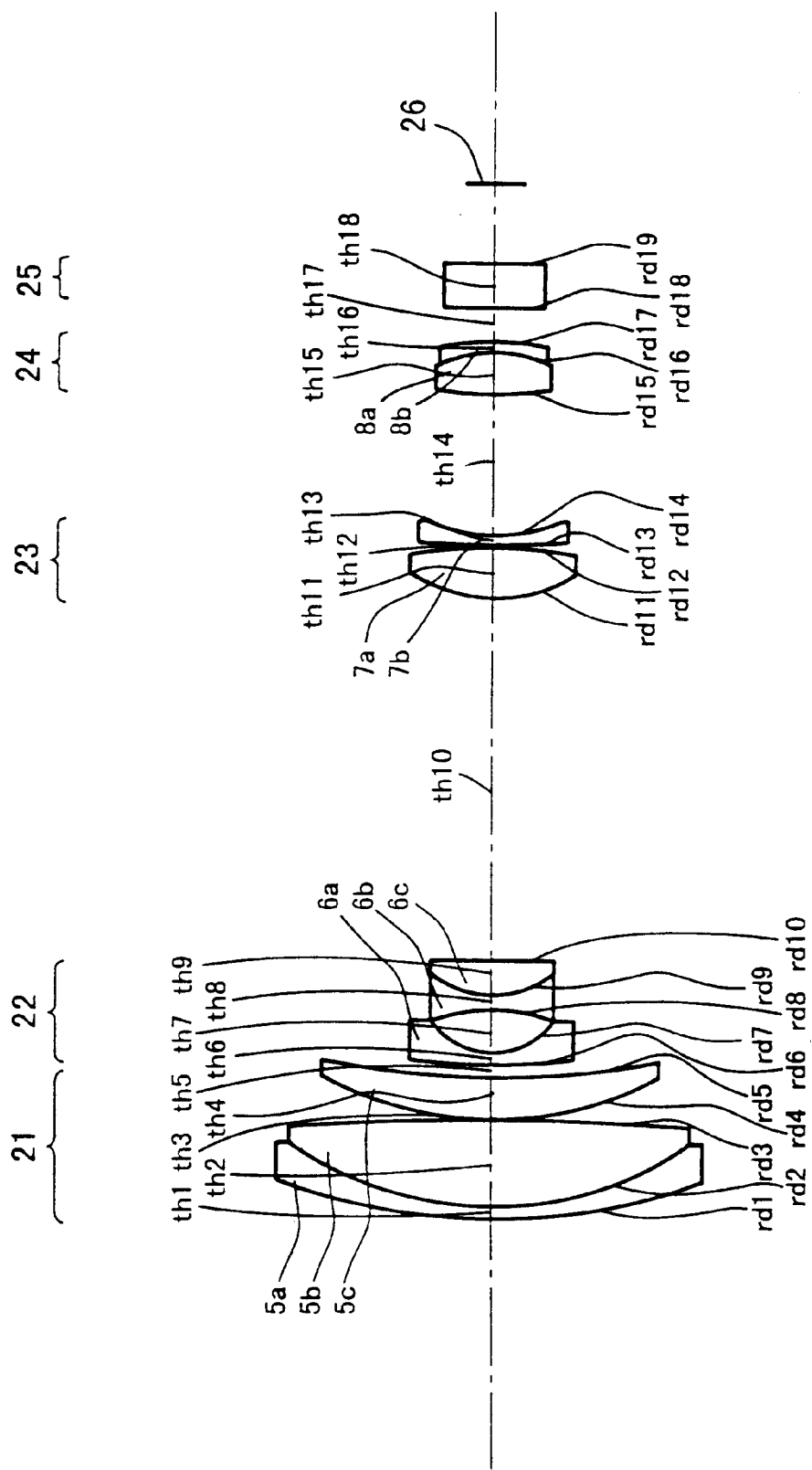
FIG. 5 is a view showing a configuration of a zoom lens according to a second embodiment of the present invention.

FIG. 5 is a view showing a configuration of a zoom lens according to a second embodiment of the present invention. As shown in FIG. 5, a zoom lens has a structure in which a first lens group 21, a second lens group 22, a third lens group 23, a fourth lens group 24, and a plate glass 25 are disposed from an object side (left side in FIG. 5) to an image plane 26 side (right side in FIG. 5) in this order. The plate glass 25 is optically equivalent to a crystal filter, a face plate of an image pick-up device, or the like.

The first lens group 21 has a positive refracting power, and is fixed with respect to the image plane 26 even in varying power and focusing. The second lens group 22 has a negative refracting power and varies power by moving along an optical axis. The third lens group 23 has a positive refracting power and is fixed with respect to the image plane 26 even in varying power and focusing. The fourth lens group 24 has a positive refracting power and moves on the optical axis so that it keeps the image plane 26 following up the movement of the second lens group 22 and the object at a constant position with respect to the standard plane, thereby carrying out moving of an image due to a variable power and adjusting the focus at the same time.

The first lens group 21 includes a negative lens 5a, a positive lens 5b, and a positive lens 5c having a convex surface facing the object side, disposed from the object side in this order. The second lens group 22 includes a negative lens 6a and a cemented lens of a biconcave lens 6b and a positive lens 6c, disposed from the object side in this order, in which at least one surface of the lenses is an aspherical surface.

The third lens group 23 includes a positive lens 7a and a negative meniscus lens 7b having a convex surface facing the object side, disposed from the object side in this order, in which at least one surface of the lenses is an aspherical surface. The fourth lens group 24 includes a cemented lens of a positive lens 8a and a negative lens 8b being deposed from the object side in this order, in which at least one surface of the lens has an aspherical surface.

Furthermore, in the zoom lens of this embodiment, the following expressions (11) to (14) are satisfied:

$$9.0 < f1/fw < 10.5 \tag{11}$$

$$1.2 < f2/fw < 1.6 \tag{12}$$

$$4.5 < f3/fw < 6.0 \tag{13}$$

$$4.0 < f4/fw < 5.5 \tag{14}$$

where f1 is a composed focal length of the first lens group 21, f2 is a composed focal length of the second lens group 22, f3 is a composed focal length of the third lens group 23, f4 is a composed focal length of the fourth lens group 24, and fw is a composed focal length of the entire system at a wide-angle end.

The expression (11) is a conditional expression relating to the refracting power of the first lens group 21. If f1/fw is less than the lower limit of the expression (11), the refracting power of the first lens group 21 is increased, which makes it difficult to correct a spherical aberration at the side of the long focal length, in particular in the range where the focal length is 18 times or more, and an off-axis coma-aberration. As a result, the high performance of the zoom lens cannot be achieved. On the other hand, if f1/fw is more than the upper limit of the expression (11), the full length of the lens becomes longer than necessary, which makes it impossible to realize a compact zoom lens. Also, a movement amount of the second lens group 22 in zooming becomes large, which increases the electric power consumption and thus shortens the drive time of the battery.

The expression (12) is a conditional expression relating to the refracting power of the second lens group 22. If f2/fw is less than the lower limit of the expression (12), the Petzval sum of the entire system becomes large, which makes it impossible to correct a curvature of the image plane, and the focus location of a meridional image plane differs from that of a sagittal image plane. Therefore, high performance of the zoom lens cannot be achieved. On the other hand, if |f2/fw| is more than the upper limit of the expression (12), the Petzval sum becomes small and an excellent performance can be obtained. However, the full length of the lens becomes longer than necessary, which makes it impossible to realize a compact zoom lens. And a movement amount of the second lens group 22 in zooming becomes large, which increases the electric power consumption and thus shortens a drive time of the battery.

The expression (13) is a conditional expression relating to the refracting power of the third lens group 23. If f3/fw is less than the lower limit of the expression (13), the refracting power of the third lens group 13 is increased, which makes it impossible to ensure a back-focus enabling a crystal filter, etc. to be inserted and makes it difficult to correct a spherical aberration. On the other hand, if f3/fw is more than the upper limit of expression (13), the Petzval sum becomes large and thus the image curvature cannot be corrected. Consequently, the focus location of a meridional image plane differs from that of a sagittal image plane, and therefore high performance of the zoom lens cannot be achieved.

The expression (14) is a conditional expression relating to the refracting power of the fourth lens group 24. If f4/fw is less than the lower limit of expression (14), it is difficult to correct an off-axis aberration both in near photographing and in long-distant photographing at the same time. On the other hand, if f4/fw is more than the upper limit of the expression (14), the back focus becomes unnecessarily large, and thus a compact zoom lens cannot be realized.

Furthermore, in the zoom lens of the present invention, the following conditional expressions are satisfied:

$$0.6 < r21/r29 < 1.3 \tag{15}$$

$$0.3 < r31/r39 < 1.9 \tag{16}$$

$$0.5 < r41/r49 < 1.1 \tag{17}$$

where r21 is a local radius of curvature in a diameter corresponding to 10% of the lens effective diameter and r29 is a local radius of curvature in a diameter corresponding to 90% of the lens effective diameter in an aspherical lens of the second lens group 22; r31 is a local radius of curvature in a diameter corresponding to 10% of the lens effective diameter and r39 is a local radius of curvature in a diameter corresponding to 90% of the lens effective diameter in an aspherical lens of the third lens group 23; and r41 is a local radius of curvature in a diameter corresponding to 10% of the lens effective diameter and r49 is a local radius of curvature in a diameter corresponding to 90% of the lens effective diameter in an aspherical lens of the fourth lens group 24.

If these conditional expressions are satisfied, it is possible to obtain a satisfactory aberration performance to realize a high resolution zoom lens. The expression (15) is a conditional expression relating to an amount of an aspherical surface of the aspherical lens of the second lens group 22. When r21/r29 is less than the lower limit of the expression (15), an aspherical aberration cannot be corrected satisfactorily, and thus, the satisfactory aberration performance cannot be obtained. On the other hand, when r21/r29 is more than the upper limit of the expression (15), an aspherical aberration cannot be corrected satisfactorily, in particular in near photographing, and thus the satisfactory aberration performance cannot be obtained.

The expression (16) is a conditional expression relating to an amount of aspherical surface of an aspherical lens of the third lens group 23. When r31/r39 is less than the lower limit of the expression (16), an aspherical aberration cannot be corrected satisfactorily, and thus the satisfactory aberration performance cannot be obtained. On the other hand, when r31/r39 is more than the upper limit of the expression (16), excess correction of the aspherical aberration is performed and a coma flare is likely to occur. The expression (17) is a conditional expression relating to an amount of aspherical surface of an aspherical lens of the fourth lens group 24. When r41/r49 is less than the lower limit of the expression (17) or is more than the upper limit of the expression (17), a total balance of aberration between a wide-angle end and a telephoto end is lost, and thus the satisfactory aberration performance cannot be obtained.

Furthermore, in the zoom lens of this embodiment, the following expression is satisfied:

$$0.8 < BF/fw < 1.7 \qquad (18)$$

where fw is a composed focal length of the entire system at a wide-angle end and BF is an air distance between the end surface of the lens and the image plane 26.

If this expression is satisfied, it is possible to ensure a satisfactory back-focus enabling a low-pass filter such as an IR cut filter, a crystal filter, and the like to be inserted. When BF/fw is less than the lower limit of the expression (18), it is not possible to ensure a satisfactory space enabling a low pass filter such as an IR cut filter, a crystal filter, and the like to be inserted. On the other hand, when BF/fw is more than the upper limit of the expression (18), the back focus becomes unnecessarily large, and thus a compact zoom lens cannot be realized.

Furthermore, in the zoom lens of this embodiment, a radius of curvature of a surface disposed closest to the image plane side of the first lens group 21 and a radius of curvature of a surface disposed closest to the object side of the second lens group 22 have the same value. Thereby, it is possible to prevent the spacing between the surface disposed closest to the image plane side of the first lens group 21 and the surface disposed closest to the object side of the second lens group 22 from being reduced. Thus, a lens barrel can be formed easily.

Furthermore, in the zoom lens of this embodiment, the following conditional expression is satisfied:

$$|\{sag(r1) - sag(r2) - d8\}/d8| < 4.5 \qquad (19)$$

where sag (r1) denotes a sag amount between the center of the lens on the incident surface of the negative lens of the cemented lens and the position where the incident surface of the negative lens of the cemented lens is brought into contact with the outgoing surface of the negative lens disposed closest to the object side of the second lens group; sag (r2) denotes a sag amount between the center of the lens and the outermost peripheral portion on the outgoing surface on the negative lens of the cemented lens; and d8 denotes a thickness of a lens.

If this expression is satisfied, a biconcave lens can be formed easily, suitably improving the yield. The expression (19) is a conditional expression relating to an eccentricity of a wall thickness. If |{sag(r1)−sag(r2)−d8}/d8| is more than the upper limit of the conditional expression (19), the ratio of a wall thickness of the central portion of the lens to an edge thickness of the peripheral portion is increased, thus making it difficult to mold a lens. As a result, the yield is lowered and a low cost of lenses cannot be realized.

EXAMPLE 2

The following Table 4 shows an example of the zoom lens of this embodiment.

TABLE 4

| Group | Surface | rd | th | nd | υ |
|---|---|---|---|---|---|
| 1 | 1 | 34.72 | 0.75 | 1.80518 | 25.4 |
|   | 2 | 19.74 | 4.98 | 1.58913 | 61.2 |
|   | 3 | −602.11 | 0.15 |   |   |
|   | 4 | 19.52 | 2.83 | 1.60311 | 60.7 |

TABLE 4-continued

| Group | Surface | rd | th | nd | υ |
|---|---|---|---|---|---|
|   | 5 | 55.40 | variable |   |   |
| 2 | 6 | 55.40 | 0.62 | 1.80500 | 39.6 |
|   | 7 | 4.49 | 2.62 |   |   |
|   | 8* | −8.59 | 0.80 | 1.60602 | 57.8 |
|   | 9 | 5.56 | 2.00 | 1.80518 | 25.5 |
|   | 10 | 61.57 | variable |   |   |
| 3 | 11* | 8.46 | 3.20 | 1.66546 | 55.4 |
|   | 12* | −16.89 | 0.15 |   |   |
|   | 13 | 99.80 | 0.60 | 1.80518 | 25.5 |
|   | 14 | 10.29 | variable |   |   |
| 4 | 15* | 14.88 | 2.60 | 1.60602 | 57.8 |
|   | 16 | −7.68 | 0.70 | 1.68893 | 31.2 |
|   | 17 | −15.27 | variable |   |   |
| 5 | 18 | ∞ | 2.80 | 1.51633 | 64.1 |
|   | 19 | ∞ | — |   |   |

The following Table 5 shows aspherical coefficients of the zoom lens in Table 4.

TABLE 5

| Surface | K | D | E | F | G |
|---|---|---|---|---|---|
| 8 | −5.45138 | −9.83644 × 10$^{-4}$ | −5.46488 × 10$^{6}$ | 0.0 | 0.0 |
| 11 | 0.22679 | −2.80073 × 10$^{-4}$ | 3.58391 × 10$^{-6}$ | 0.0 | 0.0 |
| 12 | 2.53793 | 3.17578 × 10$^{-4}$ | 5.70393 × 10$^{-6}$ | 0.0 | 0.0 |
| 15 | −7.76520 | 1.50745 × 10$^{-4}$ | −2.00892 × 10$^{-6}$ | 0.0 | 0.0 |

The following Table 6 shows an air distance (mm) that can be varied by zooming when an object is positioned 2 m away.

TABLE 6

|   | wide-angle end | standard position | telephoto end |
|---|---|---|---|
| focal length | 3.010 | 30.385 | 65.577 |
| F No. | 1.722 | 2.745 | 2.923 |
| angle of view(2 ω) | 65.549 | 6.702 | 3.115 |
| th5 | 0.700 | 17.330 | 20.298 |
| th10 | 21.740 | 5.110 | 2.142 |
| th12 | 8.310 | 2.616 | 6.307 |
| th17 | 2.010 | 7.704 | 4.013 |

The following are values of the above-mentioned expressions (11) to (19).

Figure 6:
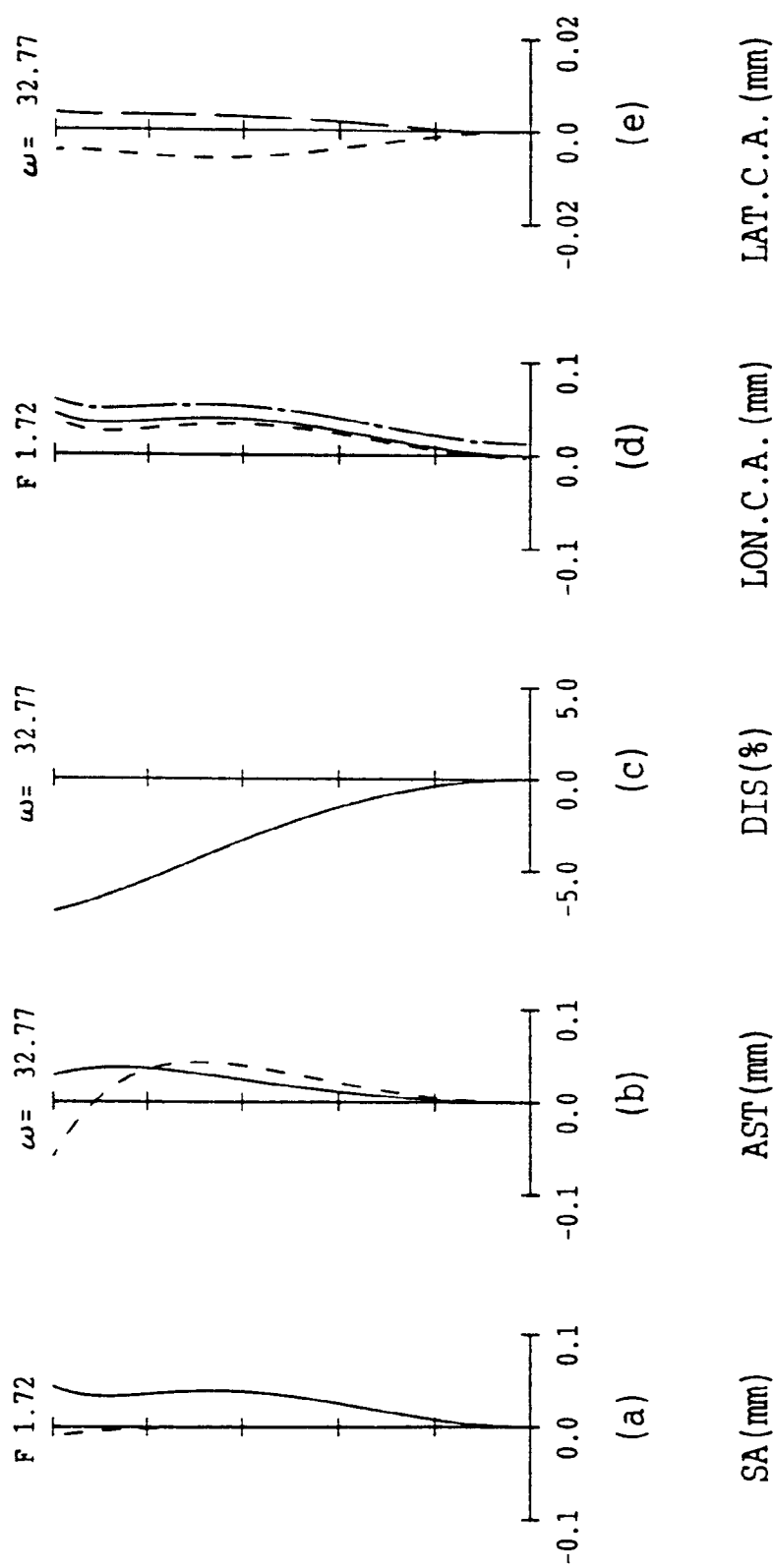
FIG. 6 illustrates various aberration performance at a wide-angle end of the zoom lens according to the second embodiment of the present invention.
Figure 7:
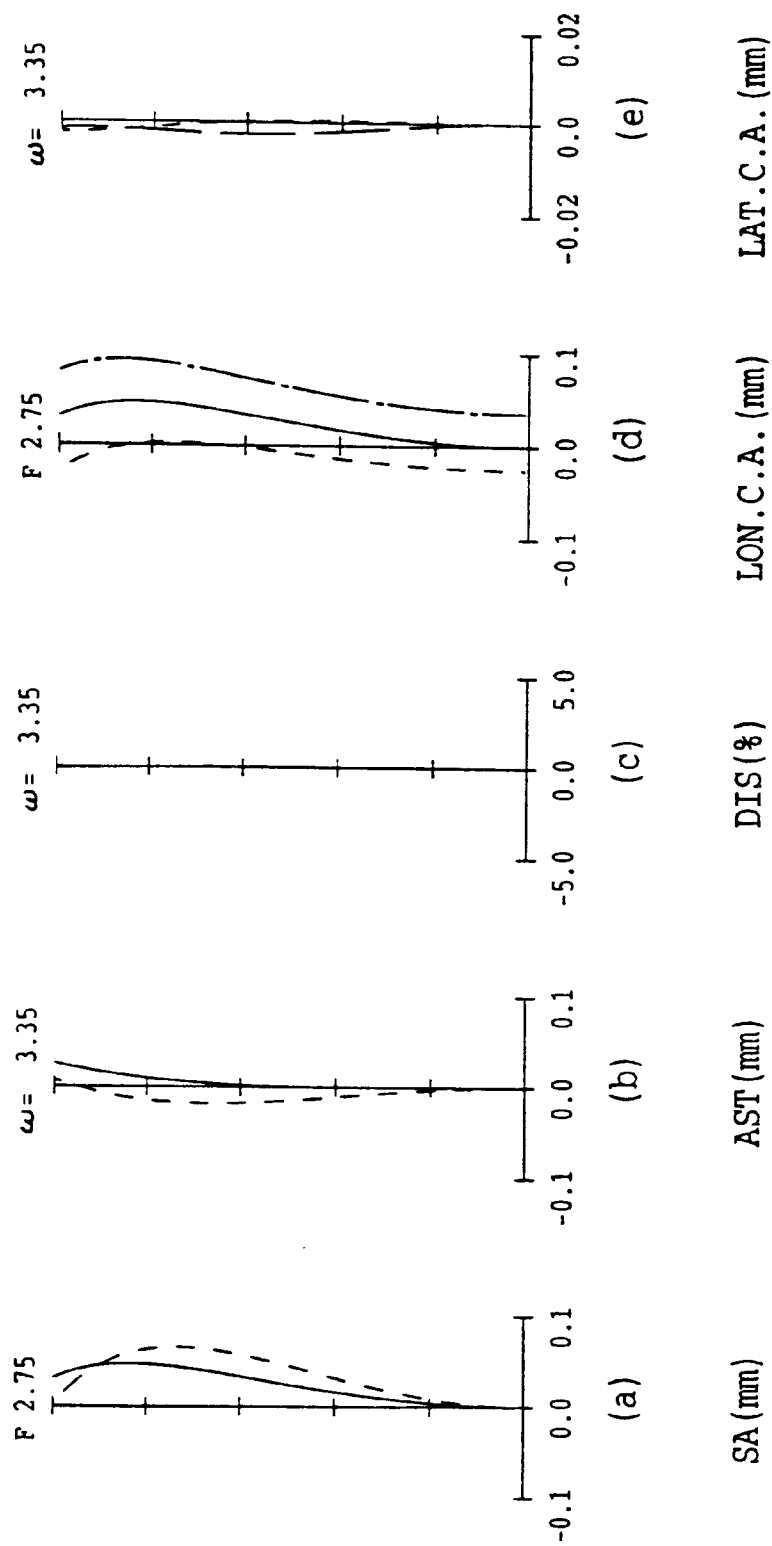
FIG. 7 illustrates various aberration performance at the standard position of the zoom lens according to the second embodiment of the present invention.
Figure 8:
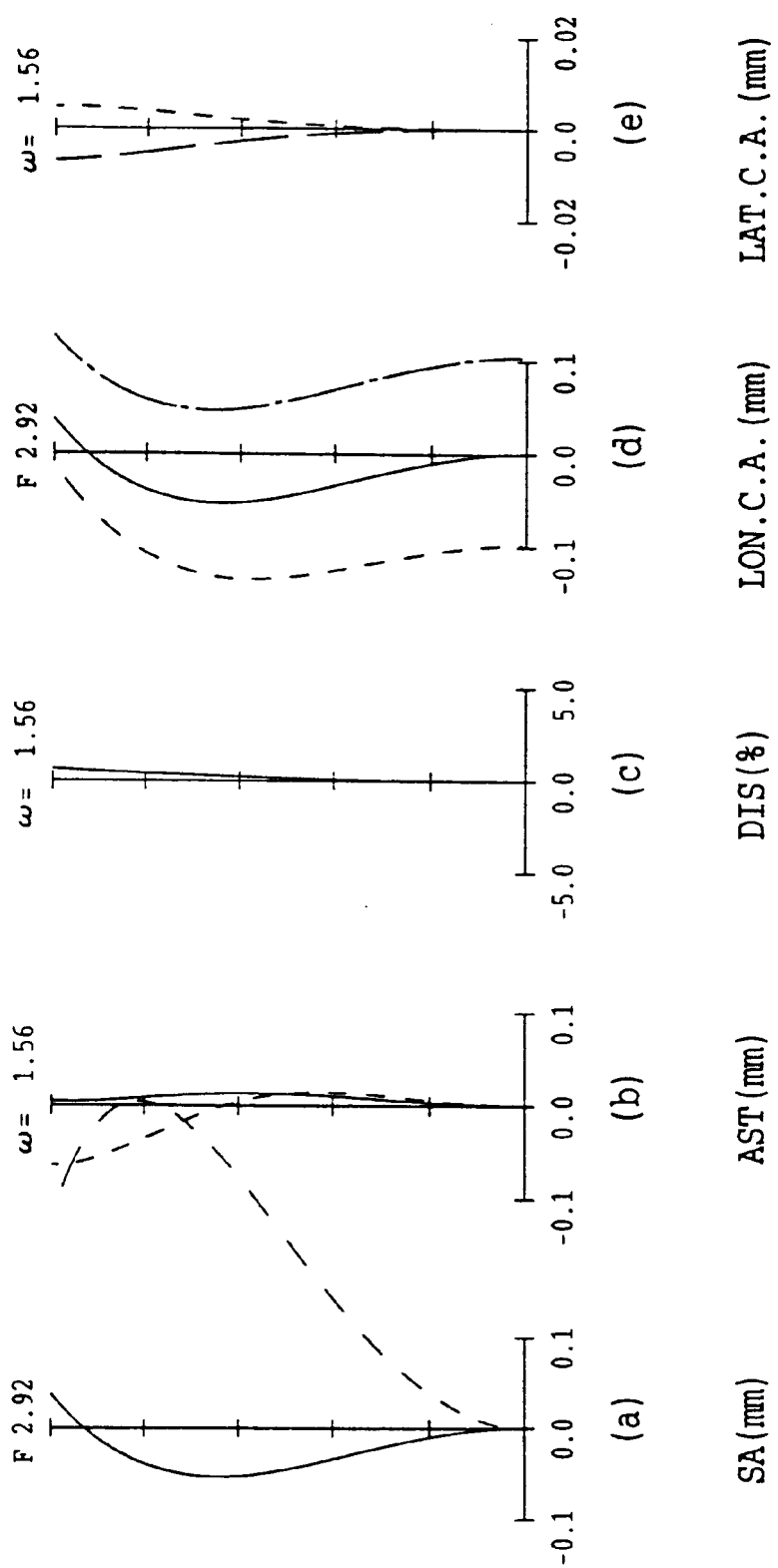
FIG. 8 illustrates various aberration performance at a telephoto end of the zoom lens according to the second embodiment of the present invention.

$f1/fw = 10.034$ $|f2/fw| = 1.433$ $f3/fw = 5.853$ $f4/fw = 4.600$ $r21/r29 = 1.057$ $r31/r39 = 0.58$ $r41/r49 = 0.938$ $BF/fw = 1.58$ $|\{sag(r1) - sag(r2) - d8\}/d8| = 3.37$ FIGS. 6 to 8 show various aberrations at the wide-angle end (FIG. 6), the standard position (FIG. 7), and the telephoto end (FIG. 8) of the zoom lens of the present embodiment. As is apparent from these aberrations, the zoom lens of Example 2 has an excellent aberration performance.

THIRD EMBODIMENT

Figure 9:
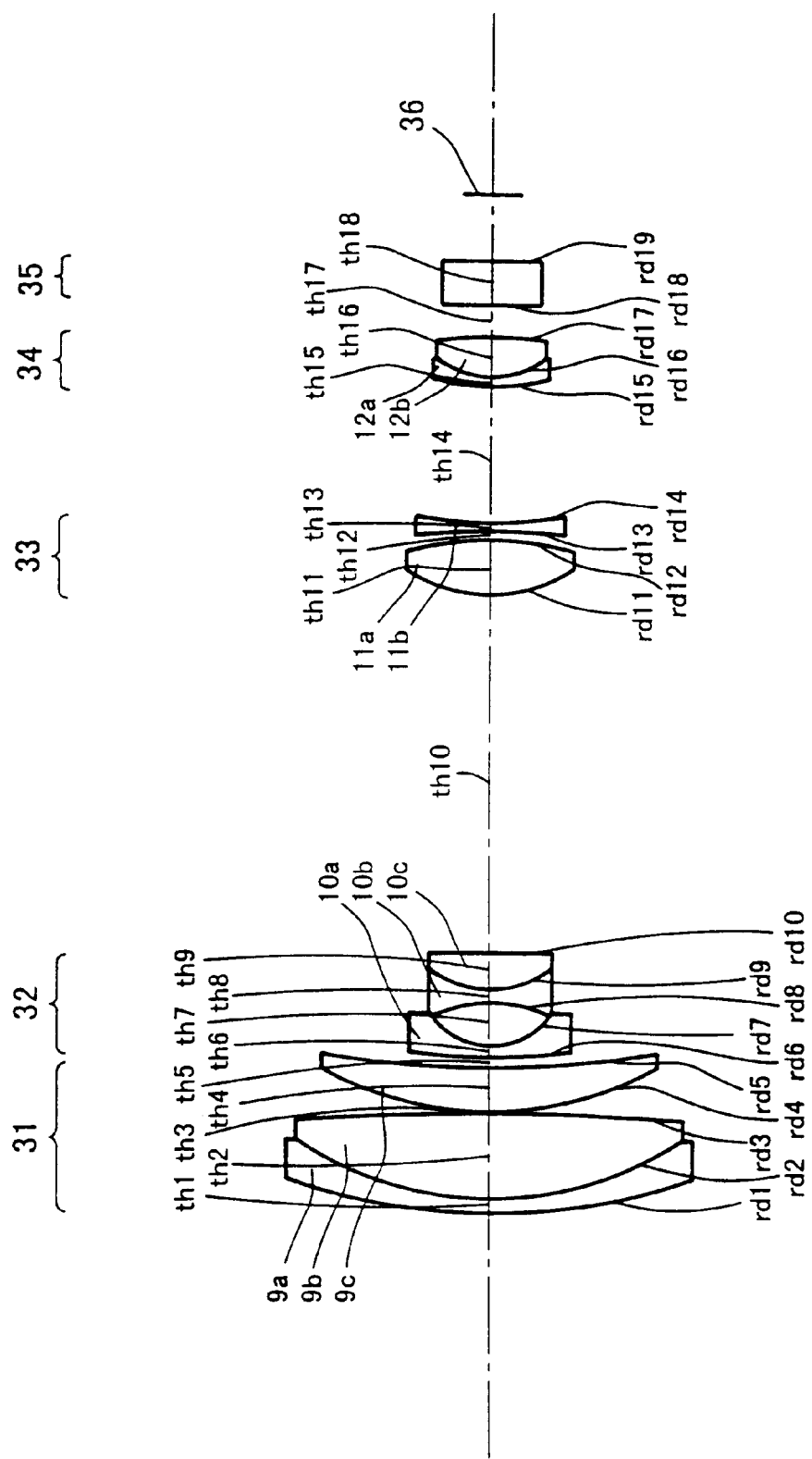
FIG. 9 is a view showing a configuration of a zoom lens according to a third embodiment of the present invention.

FIG. 9 is a view showing a configuration of a zoom lens according to a third embodiment of the present invention. As shown in FIG. 9, a zoom lens has a structure in which a first lens group 31, a second lens group 32, a third lens group 33, a fourth lens group 34, and a plate glass 35 are disposed from an object side (left side in FIG. 9) to an image plane 36 side (right side in FIG. 9) in this order. The plate glass 35 is optically equivalent to a crystal filter, a face plate of an image pick-up device, or the like.

The first lens group 31 has a positive refracting power, and is fixed with respect to the image plane 36 even in varying power and focusing. The second lens group 32 has a negative refracting power and varies power by moving along an optical axis. The third lens group 33 has a positive refracting power and is fixed with respect to the image plane 36 even in varying power and focusing.

The fourth lens group 34 has a positive refracting power and moves on the optical axis so that it keeps the image plane 36 following up the movement of the second lens group 32 and the object at a constant position with respect to the standard plane, thereby carrying out moving of an image due to a variable power and adjusting the focus at the same time.

The first lens group 31 includes a negative lens 9a, a positive lens 9b, and a positive lens 9c having a convex surface facing the object side, disposed from the object side in this order. The second lens group 32 includes a negative lens 10a and a cemented lens of a biconcave lens 10b and a negative lens 10c, disposed from the object side in this order, in which at least one surface of the lenses is an aspherical surface. The third lens group 33 includes a positive lens 11a and a negative lens 11b having a concave surface facing the object side, disposed from the object side in this order, in which at least one surface of the lenses is an aspherical surface.

The fourth lens group 34 includes a cemented lens of a negative lens 12a and a positive lens 12b, disposed from the object side in this order, in which at least one surface of the lenses has an aspherical surface.

Furthermore, in the zoom lens of this embodiment, the following expressions (20) to (23) are satisfied:

$$9.0 < f1/fw < 10.5$$

$$1.2 < |f2/fw| < 1.6$$

$$4.5 < f3/fw < 6.0$$

$$4.0 < f4/fw < 5.5$$

where f1 is a composed focal length of the first lens group 31, f2 is a composed focal length of the second lens group 32, f3 is a composed focal length of the third lens group 33, f4 is a composed focal length of the fourth lens group 34, and fw is a composed focal length of the entire system at a wide-angle end.

The expression (20) is a conditional expression relating to the refracting power of the first lens group 31. If f1/fw is less than the lower limit of the expression (20), the refracting power of the first lens group 31 is increased, so that it is difficult to correct an aspheric aberration at the side of long focal length in particular in the range where the focal length is 18 times or more, and an off-axis coma-aberration. As a result, the high performance of the zoom lens cannot be achieved. On the other hand, if f1/fw is more than the upper limit of the expression (20), the full length of the lens becomes longer than necessary, which makes it impossible to realize a compact zoom lens. Also, a movement amount of the second lens group 32 in zooming becomes large, which increases the electric power consumption and thus shortens the drive time of the battery.

The expression (21) is a conditional expression relating to the refracting power of the second lens group 32. If f2/fw is less than the lower limit of the expression (21), the Petzval sum of the entire system becomes large, so that a curvature of the image plane cannot be corrected. And the focus location of a meridional image plane differs from that of a sagittal image plane. Therefore, high performance of the zoom lens cannot be achieved. On the other hand, if |f2/fw| is more than the upper limit of the expression (21), the Petzval sum becomes small and an excellent performance can be obtained. However, the full length of the lens becomes longer than necessary, which makes it impossible to realize a compact zoom lens. Further, a movement amount of the second lens group 32 in zooming becomes large, which increases the electric power consumption and thus shortens a drive time of the battery.

The expression (22) is a conditional expression relating to the refracting power of the third lens group 33. If f3/fw is less than the lower limit of the expression (22), the refracting power of the third lens group 33 is increased, which makes it impossible to ensure a back-focus enabling a crystal filter, etc. to be inserted, and makes it difficult to correct a spherical aberration. On the other hand, if f3/fw is more than the upper limit of expression (22), the Petzval sum becomes large and thus the image curvature cannot be corrected. And the focus location of a meridional image plane differs from that of a sagittal image plane, and therefore high performance of the zoom lens cannot be achieved.

The expression (23) is a conditional expression relating to the refracting power of the fourth lens group 34. If f4/fw is less than the lower limit of expression (23), it is difficult to correct an off-axis aberration both in near photographing and in long-distance photographing at the same time. On the other hand, if f4/fw is more than the upper limit of the expression (23), the back focus becomes unnecessarily large, and thus a compact zoom lens cannot be realized.

Furthermore, in the zoom lens of this embodiment, the following conditional expressions are satisfied:

$$0.6 < r21/r18 < 1.3 \tag{24}$$

$$0.3 < r31/r39 < 1.9 \tag{25}$$

$$0.5 < r41/r49 < 1.1 \tag{26}$$

where r21 is a local radius of curvature in a diameter corresponding to 10% of the lens effective diameter and r29 is a local radius of curvature in a diameter corresponding to 90% of the lens effective diameter in an aspherical lens of the second lens group 32; r31 is a local radius of curvature in a diameter corresponding to 10% of the lens effective diameter and r39 is a local radius of curvature in a diameter corresponding to 90% of the lens effective diameter in an aspherical lens of the third lens group 33; and r41 is a local radius of curvature in a diameter corresponding to 10% of the lens effective diameter and r49 is a local radius of curvature in a diameter corresponding to 90% of the lens effective diameter in an aspherical lens of the fourth lens group 34.

If these conditional expressions are satisfied, it is possible to obtain a satisfactory aberration performance to realize the high resolution of a zoom lens. The expression (24) is a conditional expression relating to an amount of an aspherical surface of the aspherical lens of the second lens group 32. When r21/r29 is less than the lower limit of the expression (24), an aspherical aberration cannot be corrected satisfactorily, and thus, the satisfactory aberration performance cannot be obtained. On the other hand, when r21/r29 is more than the upper limit of the expression (24), an aspherical aberration cannot be corrected satisfactorily, in particular in near photographing, and thus the satisfactory aberration performance cannot be obtained.

The expression (25) is a conditional expression relating to an amount of aspherical surface of an aspherical lens of the third lens group 33. When r31/r39 is less than the lower limit of the expression (25), an aspherical aberration cannot be corrected satisfactorily, and thus the satisfactory aberration performance cannot be obtained. On the other hand, when r31/r39 is more than the upper limit of the expression (25), excess correction is performed and a coma flare is likely to occur.

The expression (26) is a conditional expression relating to an amount of aspherical surface of an aspherical lens of the fourth lens group 34. When r41/r49 is less than the lower limit of the expression (26) or is more than the upper limit of the expression (26), a total balance of aberration between a wide-angle end and a telephoto end is lost, and thus the satisfactory aberration performance cannot be obtained.

Furthermore, in the zoom lens of this embodiment, the following expression is satisfied:

$$0.8 < BF/fw < 1.7 \tag{27}$$

where fw is a composed focal length of the entire system at a wide-angle end and BF is an air distance between the end surface of the lens and the image plane 36.

If the above-mentioned expression (27) is satisfied, it is possible to ensure a satisfactory back-focus enabling a low-pass filter such as an IR cut filter, a crystal filter, and the like to be inserted. When BF/fw is less than the lower limit of the expression (27), it is not possible to ensure a satisfactory space enabling a low pass filter such as an IR cut filter, a crystal filter, and the like to be inserted. On the other hand, when BF/fw is more than the upper limit of the expression (27), the back focus becomes unnecessarily large, and thus a compact zoom lens cannot be realized.

Furthermore, in the zoom lens of this embodiment, a radius of curvature of a surface disposed closest to the image plane side of the first lens group 31 and a radius of curvature of a surface disposed closest to the object side of the second lens group 32 have the same value. Thereby, it is possible to prevent the spacing between the surface disposed closest to the image plane side of the first lens group 31 and the surface disposed closest to the object side of the second lens group 32 from being reduced. Thus, a lens barrel can be formed easily.

Furthermore, in the zoom lens of this embodiment, the following expression (28) is satisfied:

$$|\{\text{sag}(r1) - \text{sag}(r2) - d8\}/d8| < 4.5$$

where sag (r1) denotes a sag amount between the center of the lens on the incident surface of the negative lens of the cemented lens and the position where the incident surface of the negative lens of the cemented lens is brought into contact with the outgoing surface of the negative lens disposed closest to the object side of the second lens group 32; sag (r2) denotes a sag amount between the center of the lens and the outermost peripheral portion on the outgoing surface on the negative lens of the cemented lens; and d8 denotes a thickness of a lens.

If this expression (28) is satisfied, a biconcave lens can be formed easily, suitably improving the yield. The expression (28) is a conditional expression relating to an eccentricity of a wall thickness. If |{sag(r1)−sag (r2)−d8}/d8 | is more than the upper limit of the conditional expression (28), the ratio of a wall thickness of the central portion of the lens to an edge thickness of the peripheral portion is increased, thus making it difficult to mold a lens. As a result, the yield is lowered and a low cost of lenses cannot be realized.

EXAMPLE 3

The following Table 7 shows an example of the zoom lens of this embodiment.

TABLE 7

| Group | Surface | rd | th | nd | υ |
|---|---|---|---|---|---|
| 1 | 1 | 37.31 | 0.80 | 1.80518 | 25.4 |
|  | 2 | 20.08 | 5.05 | 1.58913 | 61.2 |
|  | 3 | −277.05 | 0.15 |  |  |
|  | 4 | 18.82 | 2.75 | 1.60311 | 60.7 |
|  | 5 | 51.75 | variable |  |  |
| 2 | 6 | 51.75 | 0.60 | 1.80500 | 39.6 |
|  | 7 | 4.37 | 2.71 |  |  |
|  | 8* | −8.59 | 0.80 | 1.60602 | 57.8 |
|  | 9 | 5.51 | 2.20 | 1.80518 | 25.5 |
|  | 10 | 71.99 | variable |  |  |
| 3 | 11* | 8.87 | 3.30 | 1.60602 | 57.8 |
|  | 12* | −14.19 | 0.52 |  |  |
|  | 13 | −67.93 | 0.6 | 1.80518 | 25.5 |
|  | 14 | 18.75 | variable |  |  |
| 4 | 15 | 12.07 | 0.60 | 1.68893 | 31.2 |
|  | 16 | 5.27 | 2.45 | 1.60602 | 57.8 |
|  | 17* | −23.43 | variable |  |  |
| 5 | 18 | ∞ | 2.80 | 1.51633 | 64.1 |
|  | 19 | ∞ | — |  |  |

The following Table 8 shows aspherical coefficients of the zoom lens in Table 7.

TABLE 8

| Surface | K | D | E | F | G |
|---|---|---|---|---|---|
| 8 | −11.79950 | −2.20951 × $10^{-3}$ | 1.33194 × $10^{-4}$ | −1.25908 × $10^{-5}$ | 5.36379 × $10^{-7}$ |
| 11 | 0.80692 | −3.04534 × $10^{-4}$ | 1.27418 × $10^{-6}$ | 5.26870 × $10^{-8}$ | 1.29449 × $10^{-9}$ |
| 12 | 4.43112 | 5.06034 × $10^{-4}$ | 7.15827 × $10^{-6}$ | 1.66320 × $10^{-7}$ | 4.22176 × $10^{-9}$ |
| 17 | −62.27250 | −3.96005 × $10^{-4}$ | 6.66167 × $10^{-6}$ | −1.40428 × $10^{-6}$ | −8.96960 × $10^{-8}$ |

The following Table 9 shows an air distance (mm) that can be varied by zooming when an object is positioned 2 m away.

TABLE 9

|  | wide-angle end | standard position | telephoto end |
|---|---|---|---|
| focal length | 3.002 | 29.770 | 64.980 |
| F No. | 1.671 | 2.651 | 2.930 |
| angle of view(2 ω) | 64.843 | 6.840 | 3.134 |
| th5 | 0.700 | 17.347 | 20.298 |
| th10 | 21.740 | 5.093 | 2.142 |
| th12 | 8.3148 | 2.551 | 6.232 |
| th17 | 2.005 | 7.769 | 4.088 |

The following are values of the above-mentioned expressions (20) to (28).

f1/fw=9.981

|f2/fw|=1.424 f3/fw=5.334 f4/fw=5.083 r21/r29=1.036 r31/r39=0.51 r41/r49=0.923

BF/fw=1.32

|{sag(r1)-sag(r2)-d8}/d8|=3.37

Figure 10:
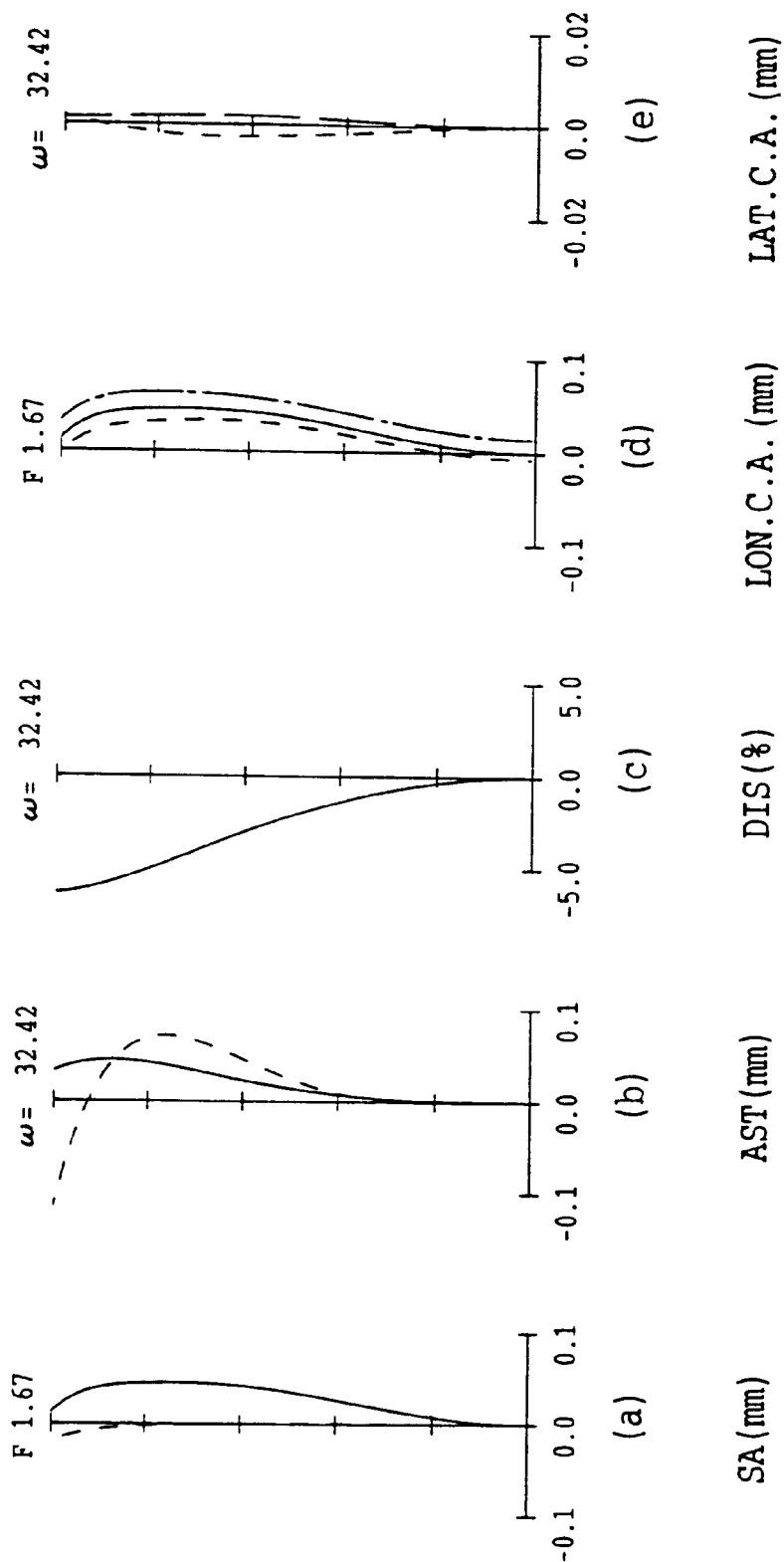
FIG. 10 illustrates various aberration performance at a wide-angle end of the zoom lens according to the third embodiment of the present invention.
Figure 11:
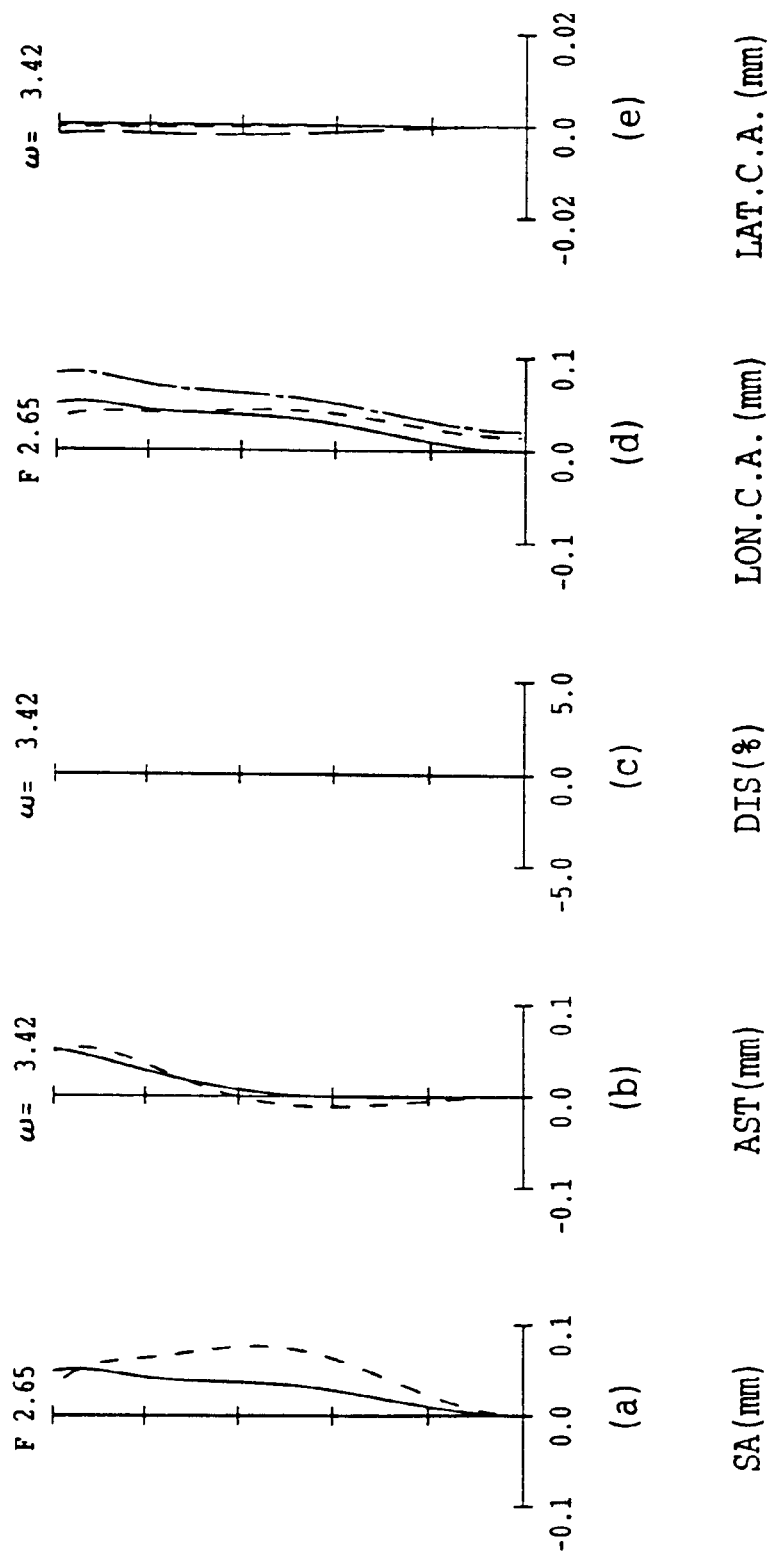
FIG. 11 illustrates various aberration performance at the standard position of the zoom lens according to the third embodiment of the present invention.
Figure 12:
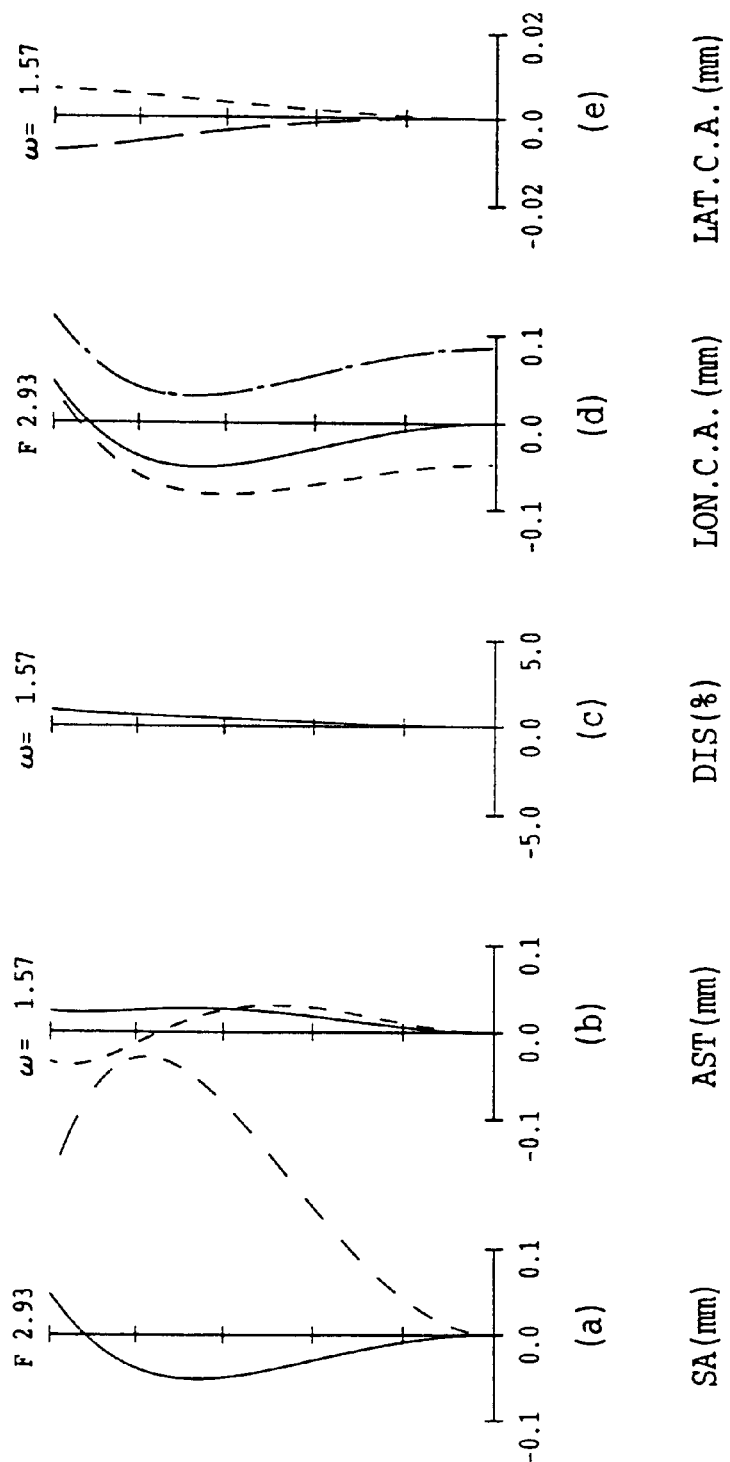
FIG. 12 illustrates various aberration performance at a telephoto end of the zoom lens according to the third embodiment of the present invention.

FIGS. 10 to 12 show various aberrations at the wide-angle end (FIG. 10), the standard position (FIG. 11), and the telephoto end (FIG. 12 of the zoom lens of the present embodiment. As is apparent from these drawings showing aberration, the zoom lens of Example 3 has an excellent aberration performance.

FOURTH EMBODIMENT

Figure 13:
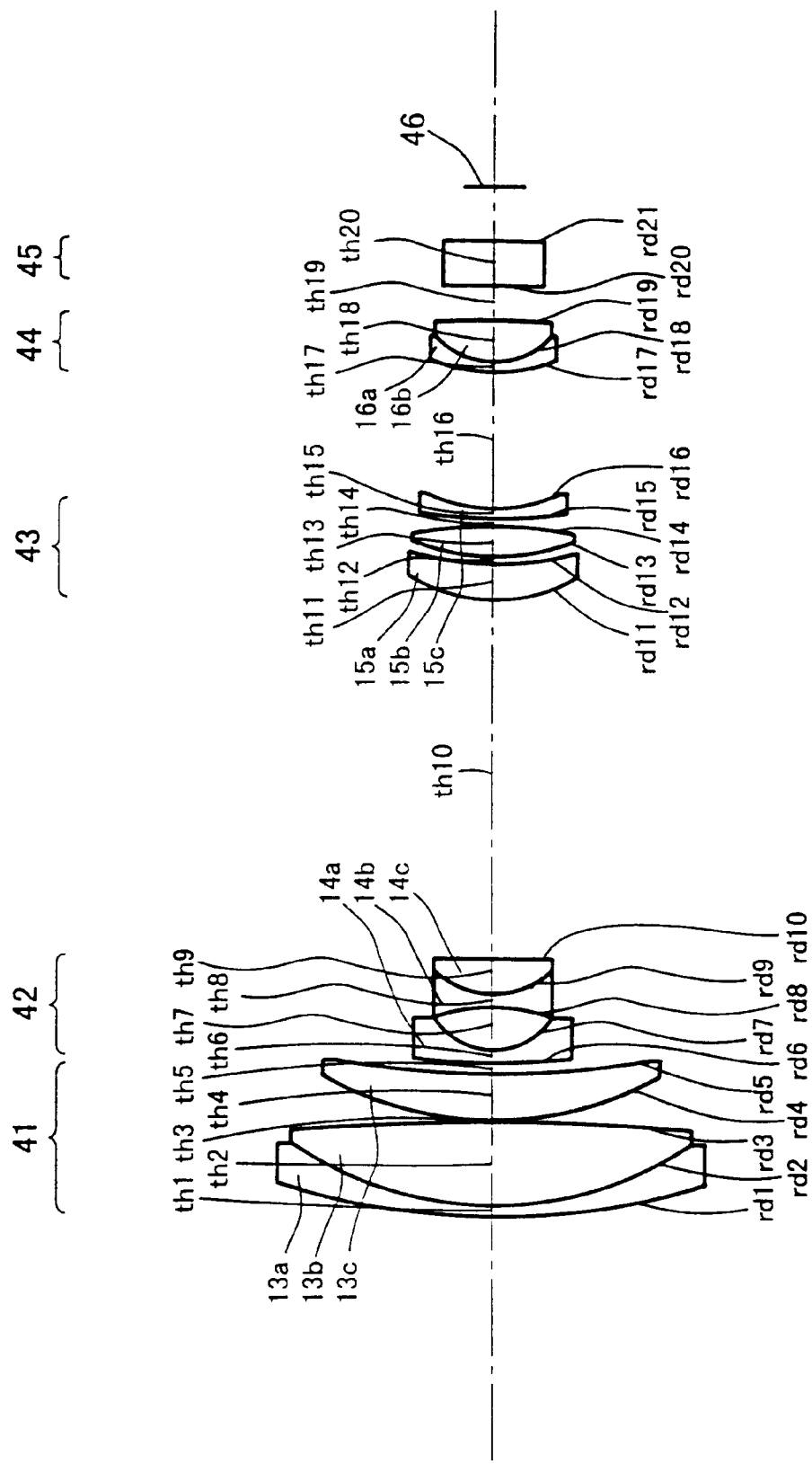
FIG. 13 is a view showing a configuration of a zoom lens according to a fourth embodiment of the present invention.

FIG. 13 is a view showing a configuration of a zoom lens according to a fourth embodiment of the present invention. As shown in FIG. 13, a zoom lens has a structure in which a first lens group 41, a second lens group 42, a third lens group 43, a fourth lens group 44, and a plate glass 45 are disposed from an object side deft side in FIG. 13) to an image plane 46 side (right side in FIG. 13) in this order. The plate glass 45 is optically equivalent to a crystal filter, a face plate of an image pick-up device, or the like.

The first lens group 41 has a positive refracting power, and is fixed with respect to the image plane 46 even in varying power and focusing. The second lens group 42 has a negative refracting power and varies power by moving along an optical axis. The third lens group 43 has a positive refracting power and is fixed with respect to the image plane 46 even in varying power and focusing.

The fourth lens group 44 has a positive refracting power and moves on the optical axis so that it keeps the image plane 46 following up the movement of the second lens group 42 and the object at a constant position with respect to the standard plane, thereby carrying out moving of an image due to a variable power and adjusting the focus at the same time. The first lens group 41 includes a negative lens 13a, a positive lens 13b, and a positive lens 13c having a convex surface facing the object side, disposed from the object side in this order.

The second lens group 42 includes a negative lens 14a and a cemented lens of a biconcave lens 14b and a positive lens 14c, disposed from the object side in this order, in which at least one surface of the lenses is an aspherical surface. The third lens group 43 includes a positive lens 15a having a convex surface facing the object side, a positive lens 15b and a negative meniscus lens 15c having a convex surface facing the object side, disposed from the object side in this order, in which at least one surface of the lenses is an aspherical surface. The fourth lens group 44 includes a cemented lens of a negative lens 16a and a positive lens 16b, disposed from the object side in this order, in which at least one surface of the lens has an aspherical surface.

Furthermore, in the zoom lens according to the present embodiment, the following conditional expressions are satisfied:

9.0<f1/fw<10.5

1.2<|f2/fw|<1.6

4.5<f3/fw<6.0

4.0<f4/fw<5.5 where f1 is a composed focal length of the first lens group 41, f2 is a composed focal length of the second lens group 42, f3 is a composed focal length of the third lens group 43, f4 is a composed focal length of the fourth lens group 44, and fw is a composed focal length of the entire system at a wide-angle end.

The expression (29) is a conditional expression relating to the refracting power of the first lens group 41. If f1/fw is less than the lower limit of the expression (29), the refracting power of the first lens group 41 is increased, so that it is difficult to correct an aspheric aberration at the side of long focal length, in particular in the range where the focal length is 18 times or more, and an off-axis coma-aberration. As a result, the high performance of the zoom lens cannot be achieved. On the other hand, if f1/fw is more than the upper limit of the expression (29), the full length of the lens becomes longer than necessary, which makes it impossible to realize a compact zoom lens. Also, a movement amount of the second lens group 42 in zooming becomes large, which increases the electric power consumption and thus shortens the drive time of the battery.

The expression (30) is a conditional expression relating to the refracting power of the second lens group 42. If |f2/fw| is less than the lower limit of the expression (30), the Petzval sum of the entire system becomes large, so that a curvature of the image plane cannot be corrected, and the focus location of a meridional image plane differs from that of a sagittal image plane. Therefore, high performance of the zoom lens cannot be achieved. On the other hand, if |f2/fw| is more than the upper limit of the expression (30), the Petzval sum becomes small and an excellent performance can be obtained. However, the full length of the lens becomes longer than necessary, which makes it impossible to realize a compact zoom lens. And a movement amount of the second lens group 42 in zooming becomes large, which increases the electric power consumption and shortens a drive time of the battery.

The expression (31) is a conditional expression relating to the refracting power of the third lens group 43. If f3/fw is less than the lower limit of the expression (31), the refracting power of the third lens group 43 is increased, which makes it impossible to ensure a back-focus enabling a crystal filter, etc. to be inserted, and makes it difficult to correct a spherical aberration. On the other hand, if f3/fw is more than the upper limit of expression (31), the Petzval sum becomes large and thus the image curvature cannot be corrected. Consequently, the focus location of a meridional image plane differs from that of a sagittal image plane, and therefore high performance of the zoom lens cannot be achieved.

The expression (32) is a conditional expression relating to the refracting power of the fourth lens group 44. If f4/fw is less than the lower limit of expression (32), it is difficult to correct an off-axis aberration both in near photographing and in long-distance photographing at the same time. On the other hand, if f4/fw is more than the upper limit of the expression (32), the back focus becomes unnecessarily large, and thus a compact zoom lens cannot be realized.

Furthermore, in the zoom lens of the present invention, the following conditional expressions are satisfied:

$$0.6 < r21/r29 < 1.3 \quad (33)$$

$$0.3 < r31/r39 < 1.9 \quad (34)$$

$$0.5 < r41/r49 < 1.1 \quad (35)$$

where r21 is a local radius of curvature in a diameter corresponding to 10% of the lens effective diameter and r29 is a local radius of curvature in a diameter corresponding to 90% of the lens effective diameter in an aspherical lens of the second lens group 42; r31 is a local radius of curvature in a diameter corresponding to 10% of the lens effective diameter and r39 is a local radius of curvature in a diameter corresponding to 90% of the lens effective diameter in an aspherical lens of the third lens group 43; and r41 is a local radius of curvature in a diameter corresponding to 10% of the lens effective diameter and r49 is a local radius of curvature in a diameter corresponding to 90% of the lens effective diameter in an aspherical lens of the fourth lens group 44.

If these conditional expressions are satisfied, it is possible to obtain a satisfactory aberration performance to realize the high resolution of a zoom lens. The expression (33) is a conditional expression relating to an amount of an aspherical surface of the aspherical lens of the second lens group 42. When r21/r29 is less than the lower limit of the expression (33), an aspherical aberration cannot be corrected satisfactorily, and thus the satisfactory aberration performance cannot be obtained.

On the other hand, when r21/r29 is more than the upper limit of the expression (33), an aspherical aberration cannot be corrected satisfactorily, in particular in near photographing, and thus the satisfactory aberration performance cannot be obtained.

The expression (34) is a conditional expression relating to an amount of aspherical surface of an aspherical lens of the third lens group 43. When r31/r39 is less than the lower limit of the expression (34), an aspherical aberration cannot be corrected satisfactorily, and thus the satisfactory aberration performance cannot be obtained. On the other hand, when r31/r39 is more than the upper limit of the expression (34), excess correction of the aspherical aberration is performed and a coma flare is likely to occur.

The expression (35) is a conditional expression relating to an amount of aspherical surface of an aspherical lens of the fourth lens group 44. When r41/r49 is less than the lower limit of the expression (35) or is more than the upper limit of the expression (35), a total balance of aberration between a wide-angle end and a telephoto end is lost, and thus the satisfactory aberration performance cannot be obtained.

Furthermore, in the zoom lens of this embodiment, the following expression is satisfied:

$$0.8 < BF/fw < 1.7 \quad (36)$$

where fw is a composed focal length of the entire system at a wide-angle end and BF is an air distance between the end surface of the lens and the image plane 46.

If the above-mentioned expression (36) is satisfied, it is possible to ensure a satisfactory back-focus enabling a low-pass filter such as an IR cut filter, a crystal filter, and the like to be inserted. When BF/fw is less than the lower limit of the expression (36), it is not possible to ensure a satisfactory space enabling a low pass filter such as an IR cut filter, a crystal filter, and the like to be inserted. On the other hand, when BF/fw is more than the upper limit of the expression (36), the back focus becomes unnecessarily large, and thus a compact zoom lens cannot be realized.

Furthermore, in the zoom lens of this embodiment, a radius of curvature of a surface disposed closest to the image plane side of the first lens group 41 and a radius of curvature of a surface disposed closest to the object side of the second lens group 42 have the same value. Thereby, it is possible to prevent the spacing between the surface disposed closest to the image plane side of the first lens group 41 and the surface disposed closest to the object side of the second lens group 42 from being reduced. Thus, a lens barrel can be formed easily.

Furthermore, in the zoom lens of this embodiment, the following expression (37) is satisfied:

$$|\{sag(r1)-sag(r2)-d8\}/d8| < 4.5$$

where sag (r1) denotes a sag amount between the center of the lens on the incident surface of the negative lens of the cemented lens and the position where the incident surface of the negative lens of the cemented lens is brought into contact with the outgoing surface of the negative lens disposed closest to the object side of the second lens group; sag (r2) denotes a sag amount between the center of the lens and the outermost peripheral portion on the outgoing surface on the negative lens of the cemented lens; and d8 denotes a thickness of a lens.

If this expression (37) is satisfied, a biconcave lens can be formed easily, suitably improving the yield. The expression (37) is a conditional expression relating to an eccentricity of a wall thickness. If $|\{sag(r1)-sag(r2)-d8\}/d8|$ is more than the upper limit of the conditional expression (37), the ratio of a wall thickness of the central portion of the lens to an edge thickness of the peripheral portion is increased, thus making it difficult to mold a lens. As a result, the yield is lowered and a low cost of lenses cannot be realized.

EXAMPLE 4

The following Table 10 shows an example of the zoom lens of this embodiment.

TABLE 10

| Group | Surface | rd | th | nd | υ |
|---|---|---|---|---|---|
| 1 | 1 | 37.65 | 0.80 | 1.80518 | 25.4 |
|   | 2 | 20.17 | 5.00 | 1.58913 | 61.2 |
|   | 3 | −178.03 | 0.15 | | |
|   | 4 | 19.50 | 2.80 | 1.60311 | 60.7 |
|   | 5 | 52.80 | variable | | |
| 2 | 6 | 52.80 | 0.60 | 1.80500 | 39.6 |
|   | 7 | 4.06 | 2.62 | | |
|   | 8* | −10.74 | 0.80 | 1.60602 | 57.8 |
|   | 9 | 5.30 | 2.10 | 1.80518 | 25.5 |
|   | 10 | 59.61 | variable | | |
| 3 | 11* | 8.92 | 2.20 | 1.60602 | 57.8 |
|   | 12* | 23.47 | 0.50 | | |
|   | 13 | 14.02 | 1.80 | 1.60602 | 57.8 |
|   | 14 | −27.64 | 0.45 | | |
|   | 15 | 23.84 | 0.60 | 1.84666 | 23.9 |
|   | 16 | 9.11 | variable | | |
| 4 | 17 | 8.85 | 0.60 | 1.68893 | 31.2 |
|   | 18 | 4.52 | 2.55 | 1.60602 | 57.8 |
|   | 19* | −45.02 | variable | | |
| 5 | 20 | ∞ | 2.80 | 1.51633 | 64.1 |
|   | 21 | ∞ | — | | |

The following Table 11 shows aspherical coefficients of the zoom lens shown in Table 10.

TABLE 11

| Surface | k | D | E | F | G |
|---|---|---|---|---|---|
| 8 | −2.17323 | −3.00532 × $10^{-6}$ | 1.80852 × $10^{-5}$ | 0.0 | 0.0 |
| 11 | 0.34951 | −1.30368 × $10^{-4}$ | 2.30684 × $10^{-6}$ | 0.0 | 0.0 |
| 12 | 0.0 | 2.86442 × $10^{-4}$ | 5.29233 × $10^{-6}$ | 6.19535 × $10^{-8}$ | −7.62238 × $10^{-11}$ |
| 15 | −154.29300 | −1.12885 × $10^{-5}$ | 3.07635 × $10^{-6}$ | 0.0 | 0.0 |

The following Table 12 shows an air distance (mm) that can be varied zooming when an object is positioned 2 m away.

TABLE 12

|  | wide-angle end | standard position | telephoto end |
|---|---|---|---|
| focal length | 3.010 | 25.700 | 63.339 |
| F No. | 1.658 | 2.243 | 2.815 |
| angle of view(2 ω) | 62.623 | 7.910 | 3.277 |
| th5 | 0.700 | 16.844 | 20.271 |
| th10 | 21.740 | 5.596 | 2.170 |
| th16 | 8.310 | 2.833 | 6.224 |
| th19 | 2.005 | 7.482 | 4.091 |

The following are values of the above-mentioned expressions (29) to (37).

Figure 14:
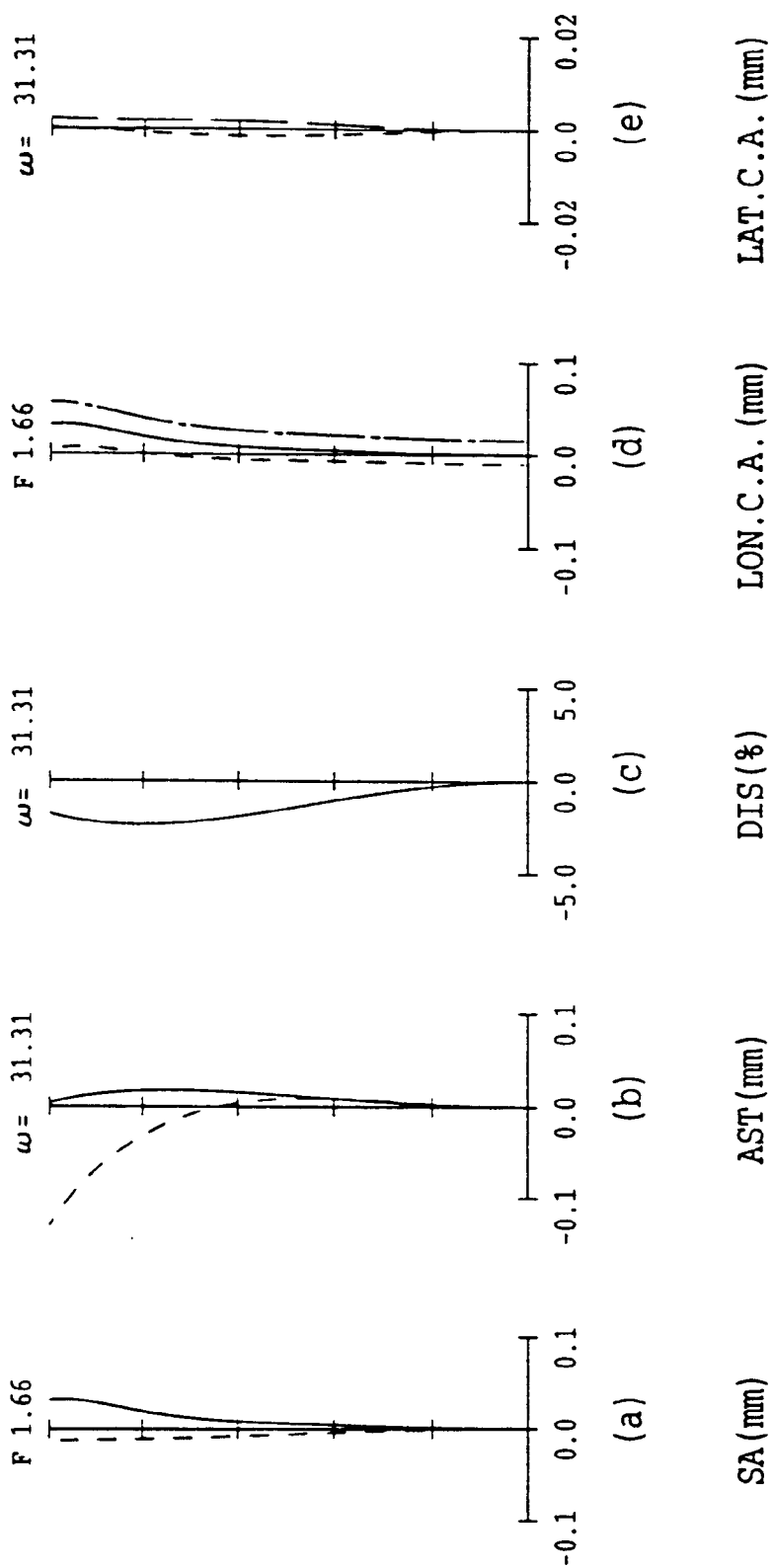
FIG. 14 illustrates various aberration performance at a wide-angle end of the zoom lens according to the fourth embodiment of the present invention.
Figure 15:
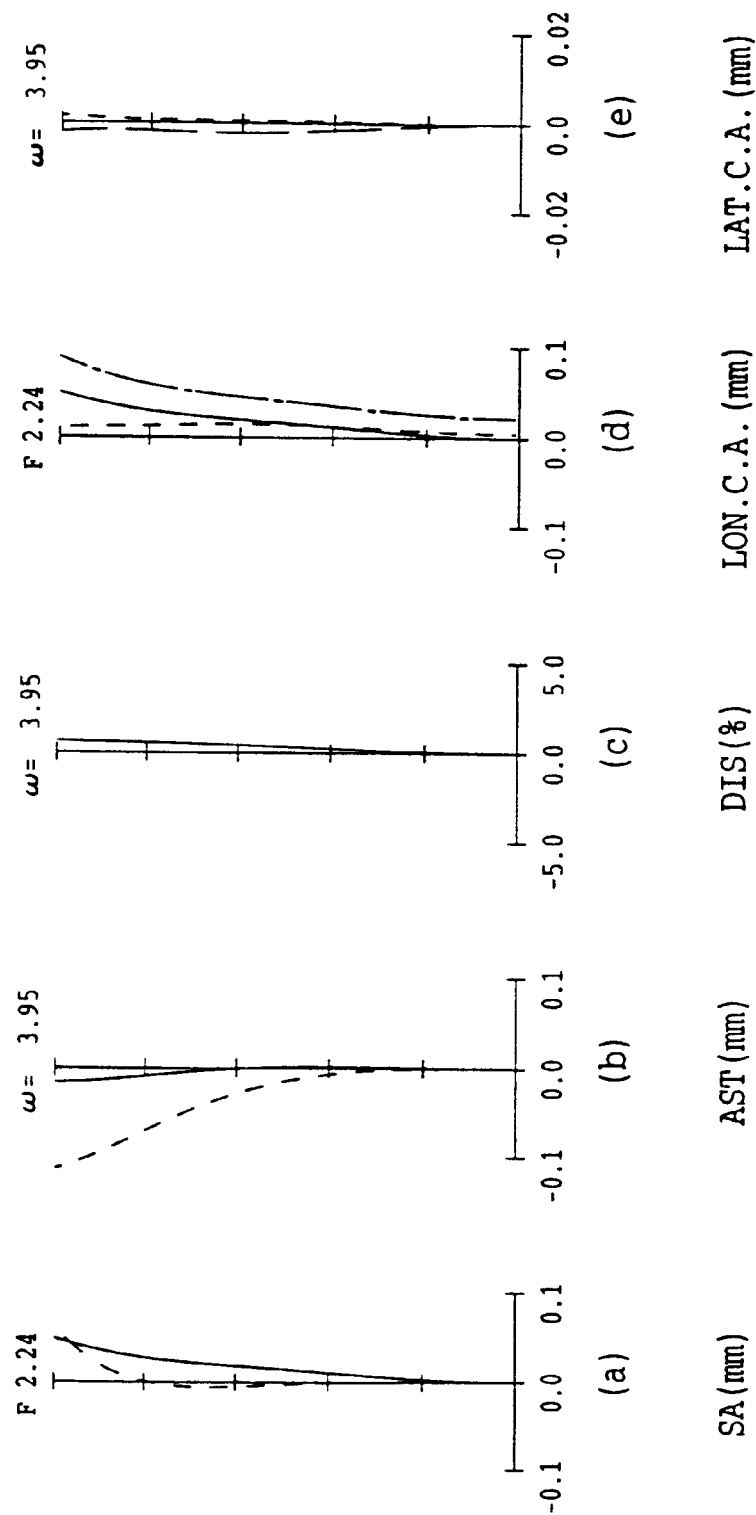
FIG. 15 illustrates various aberration performance at the standard position of the zoom lens according to the fourth embodiment of the present invention.
Figure 16:
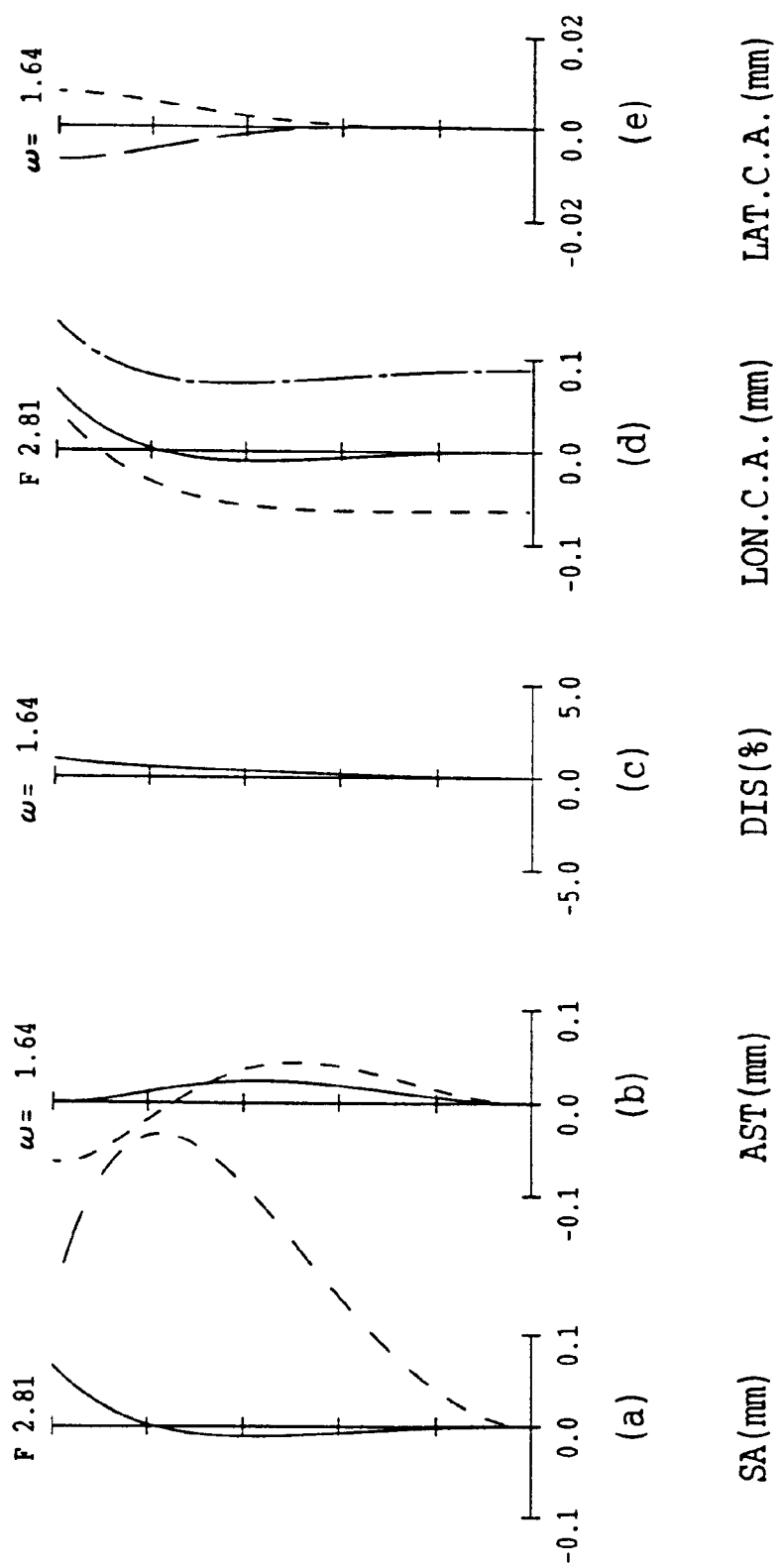
FIG. 16 illustrates various aberration performance at a telephoto end of the zoom lens according to the fourth embodiment of the present invention.

$f1/fw=9.938$ $f2/fw1.445$ $f3/fw=5.439$ $f4/fw=4.625$ $r21/r29=0.833$ $r31/r39=1.76$ $r41/r49=0.764$ $BF/fw=1.0\ 9$ $|\{sag(r1)-sag(r2)-d8\}/d8|=3.17$ FIGS. 14 to 16 show various aberrations at the wide-angle end (FIG. 14), the standard position (FIG. 15), and the telephoto end (FIG. 16) of the zoom lens of the present embodiment. As is apparent from these aberrations, the zoom lens of Example 4 has an excellent aberration performance.

FIFTH EMBODIMENT

Figure 17:
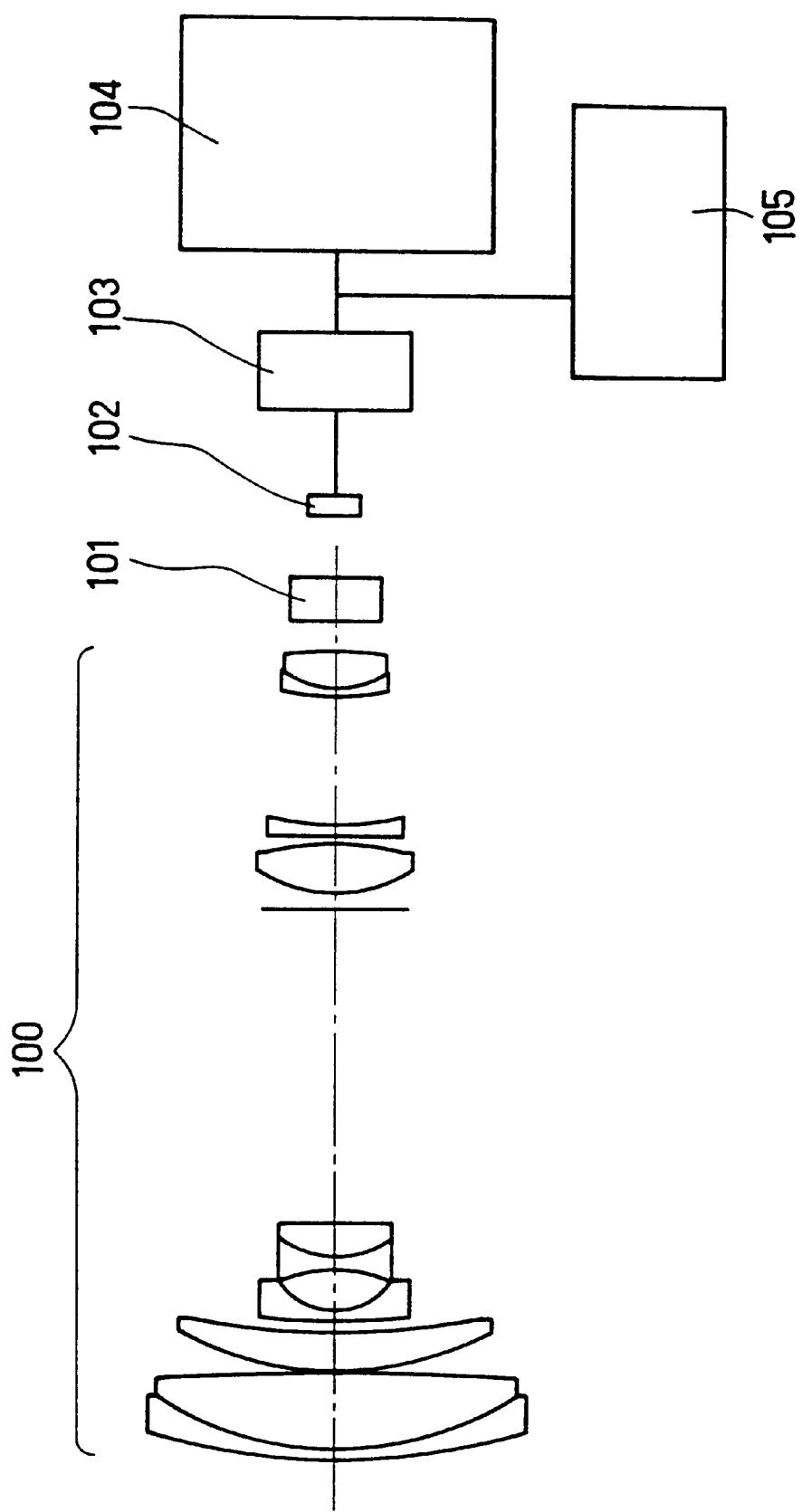
FIG. 17 is a view showing an arrangement of a video camera using the zoom lens according to one embodiment of the present invention.

FIG. 17 is a view showing an arrangement of the configuration of a video camera according to the fifth embodiment of the present invention. As shown in FIG. 17, the video camera according to this embodiment includes a zoom lens 100, low-pass filter 101, an image pick-up device 102, a signal processing circuit 103, a viewer finder 104 and a recording system 105.

Herein, as the zoom lens 100, the zoom lens according to the first embodiment is used. Furthermore, it is possible to add an additional function such as a liquid crystal panel and the like. Furthermore, according to the video camera of the present invention, a compact video camera of high image quality can be realized with a high zoom ratio of 20 times or more.

Furthermore, also even when the zoom lenses of second, third and fourth embodiments are used, a compact video camera of high image quality can be realized with a high zoom ratio of 20 times or more.

Industrial Applicability

As mentioned above, according to the zoom lens of the present invention, by selecting the appropriate power arrangement and optimal aspherical surface shape, a compact video camera with high image quality, with a brightness of an F number of 1.6, and a high zoom ratio of 20 times or more can be realized. Therefore, the lens of the present invention can be used for the zoom lens of a video camera.

What is claimed is:

1. A zoom lens comprising, a first lens group having a positive refracting power that is fixed, a second lens group having a negative refracting power and varying power by moving along an optical axis, a third lens group having a positive refracting power that is fixed, and a fourth lens group having a positive refracting power and moving along the optical axis so that it keeps an image plane following up the movement of the second lens group and an object at a constant position with respect to a standard plane, the first, second, third and fourth lens groups being disposed from a side near the object to a side far away from the object in this order;

wherein the first lens group comprises a negative lens, a positive lens, and a positive lens having a convex surface facing the object side, disposed from the object side in this order; the second lens group comprises a negative lens and a cemented lens of a negative lens and a positive lens in which the negative lens is located at the object side being disposed from the object side in this order, wherein at least one surface of the lenses is an aspherical surface; the third lens group comprises a positive lens and a negative meniscus lens having a convex surface facing the object side, disposed from the object side in this order, wherein at least one surface of the lenses is an aspherical surface, and the fourth lens group comprises a cemented lens of a negative lens and a positive lens in which the negative lens is located at the object side, wherein at least one surface of the lens has an aspherical surface; and the following relationships are satisfied:

$9.0<f1/fw<10.5$ $1.2<|f2/fw|<1.6$ $4.5<f3/fw<6.0$ $4.0<f4/fw<5.5$ where f1 is a composed focal length of the first lens group, f2 is a composed focal length of the second lens group, f3 is a composed focal length of the third lens group, f4 is a composed focal length of the fourth lens group, and fw is a composed focal length of the entire system at a wide-angle end.

2. The zoom lens according to claim 1, wherein an aspherical lens of the second lens group satisfies a relationship:

$0.6<r21/r29<1.3$, where r21 is a local radius of curvature in a diameter corresponding to 10% of the lens effective diameter and r29 is a local radius of curvature in a diameter corresponding to 90% of the lens effective diameter.

3. The zoom lens according to claim 1, wherein an aspherical lens of the third lens group satisfies a relationship:

$$0.3 < r31/r39 < 1.9,$$

where r31 is a local radius of curvature in a diameter corresponding to 10% of the lens effective diameter and r39 is a local radius of curvature in a diameter corresponding to 90% of the lens effective diameter.

4. The zoom lens according to claim 1, wherein an aspherical lens of the fourth lens group satisfies a relationship:

$$0.5 < r41/r49 < 1.1,$$

where r41 is a local radius of curvature in a diameter corresponding to 10% of the lens effective diameter and r49 is a local radius of curvature in a diameter corresponding to 90% of the lens effective diameter.

5. The zoom lens according to claim 1, wherein the following relationship is satisfied:

$$0.8 < BF/fw < 1.7,$$

where fw is a composed focal length of the entire system at a wide-angle end and BF is an air distance between the end surface of the lens and the image plane.

6. The zoom lens according to claim 1, wherein a radius of curvature of the surface of a lens disposed closest to the image plane side in the first lens group and a radius of curvature of the surface of a lens disposed closest to the object side in the second lens group have the same value.

7. The zoom lens according to claim 1, wherein the negative lens of the cemented lens of the second lens group satisfies a relationship:

$$|\{sag(r1)-sag(r2)-d8\}/d8| < 4.5,$$

where sag (r1) denotes a sag amount between the center of the lens on the incident surface of the negative lens of the cemented lens and the position where the incident surface of the negative lens of the cemented lens is brought into contact with the outgoing surface of the negative lens disposed closest to the object side of the second lens group; sag (r2) denotes a sag amount between the center of the lens and the outer-most peripheral portion on the outgoing surface on the negative lens of the cemented lens; and d8 denotes a thickness of a lens.

8. A zoom lens comprising, a first lens group having a positive refracting power that is fixed, a second lens group having a negative refracting power and varying power by moving along an optical axis, a third lens group having a positive refracting power that is fixed, and a fourth lens group having a positive refracting power and moving along the optical axis so that it keeps an image plane following up the movement of the second lens group and an object at a constant position with respect to a standard plane, the first, second, third and fourth lens groups being disposed from a side near the object to a side far away from the object in this order;
wherein the first lens group comprises a negative lens, a positive lens, and a positive lens having a convex surface facing the object side, disposed from the object side in this order; the second lens group comprises a negative lens and a cemented lens of a negative lens and a positive lens in which the negative lens is located at the object side, disposed from the object side in this order, wherein at least one surface of the lenses is an aspherical surface; the third lens group comprises a positive lens and a negative meniscus lens having a convex surface facing the object side, disposed from the object side in this order, wherein at least one surface of the lenses is an aspherical surface, and the fourth lens group comprises a cemented lens of a positive lens and a negative lens in which the positive lens is located at the object side, wherein at least one surface of the lens has an aspherical surface; and
the following relationships are satisfied:

$$9.0 < f1/fw < 10.5$$

$$1.2 < |f2/fw| < 1.6$$

$$4.5 < f3/fw < 6.0$$

$$4.0 < f4/fw < 5.5$$

where f1 is a composed focal length of the first lens group, f2 is a composed focal length of the second lens group, f3 is a composed focal length of the third lens group, f4 is a composed focal length of the third lens group, and fw is a composed focal length of the entire system at a wide-angle end.

9. The zoom lens according to claim 8, wherein an aspherical lens of the second lens group satisfies a relationship:

$$0.6 < r21/r29 < 1.3,$$

where r21 is a local radius of curvature in a diameter corresponding to 10% of the lens effective diameter and r29 is a local radius of curvature in a diameter corresponding to 90% of the lens effective diameter.

10. The zoom lens according to claim 8, wherein an aspherical lens of the third lens group satisfies a relationship:

$$0.3 < r31/r39 < 1.9,$$

where r31 is a local radius of curvature in a diameter corresponding to 10% of the lens effective diameter and r39 is a local radius of curvature in a diameter corresponding to 90% of the lens effective diameter.

11. The zoom lens according to claim 8, wherein an aspherical lens of the fourth lens group satisfies a relationship:

$$0.5 < r41/r49 < 1.1,$$

where r41 is a local radius of curvature in a diameter corresponding to 10% of the lens effective diameter and r49 is a local radius of curvature in a diameter corresponding to 90% of the lens effective diameter.

12. The zoom lens according to claim 8, wherein the following relationship is satisfied,:

$$0.8 < BF/fw < 1.7,$$

where fw is a composed focal length of the entire system at a wide-angle end and BF is an air distance between the end surface of the lens and the image plane.

13. The zoom lens according to claim 8, wherein a radius of curvature of the surface of a lens disposed closest to the image plane side in the first lens group and a radius of curvature of the surface of a lens disposed closest to the object side in the second lens group have the same value.

14. The zoom lens according to claim 8, wherein the negative lens of the cemented lens of the second lens group satisfies a relationship:

$$|\{sag(r1)-sag(r2)-d8\}/d8| < 4.5$$

where sag (r1) denotes a sag amount between the center of the lens on the incident surface of the negative lens of the cemented lens and the position where the incident surface of the negative lens of the cemented lens is brought into contact with the outgoing surface of the negative lens disposed closest to the object side of the second lens group; sag (r2) denotes a sag amount between the center of the lens and the outer-most peripheral portion on the outgoing surface on the negative lens of the cemented lens; and d8 denotes a thickness of a lens.

15. A zoom lens comprising, a first lens group having a positive refracting power that is fixed, a second lens group having a negative refracting power and varying power by moving along an optical axis, a third lens group having a positive refracting power that is fixed, and a fourth lens group having a positive refracting power and moving along the optical axis so that it keeps an image plane following up the movement of the second lens group and an object at a constant position with respect to a standard plane, the first, second, third and fourth lens groups being disposed from a side near the object to the side far away from a object in this order;

wherein the first lens group comprises a negative lens, a positive lens, and a positive lens having a convex surface facing the object side, disposed from the object side in this order; the second lens group comprises a negative lens and a cemented lens of a negative lens and a positive lens in which the negative lens is located at the object side, disposed from the object side in this order, wherein at least one surface of the lenses is an aspherical surface; the third lens group comprises a positive lens and a negative lens having a concave surface facing the object side, disposed from the object side in this order, wherein at least one surface of the lenses is an aspherical surface, and the fourth lens group comprises a cemented lenses of a negative lens and a positive lens in which the negative lens is located at the object side, wherein at least one surface of the lens has an aspherical surface; and the following relationships are satisfied:

$$9.0 < f1/fw < 10.5$$

$$1.2 < |f2/fw| < 1.6$$

$$4.5 < f3/fw < 6.0$$

$$4.0 < f4/fw < 5.5$$

where f1 is a composed focal length of the first lens group, f2 is a composed focal length of the second lens group, f3 is a composed focal length of the third lens group, f4 is a composed focal length of the fourth lens group, and fw is a composed focal length of the entire system at a wide-angle end.

16. The zoom lens according to claim 15, wherein an aspherical lens of the second lens group satisfies a relationship:

$$0.6 < r21/r29 < 1.3,$$

where r21 is a local radius of curvature in a diameter corresponding to 10% of the lens effective diameter and r29 is a local radius of curvature in a diameter corresponding to 90% of the lens effective diameter.

17. The zoom lens according to claim 15, wherein an aspherical lens of the third lens group satisfies a relationship:

$$0.3 < r31/r39 < 1.9,$$

where r31 is a local radius of curvature in a diameter corresponding to 10% of the lens effective diameter and r39 is a local radius of curvature in a diameter corresponding to 90% of the lens effective diameter.

18. The zoom lens according to claim 15, wherein an aspherical lens of the fourth lens group satisfies a relationship:

$$0.5 < r41/r49 < 1.1,$$

where r41 is a local radius of curvature in a diameter corresponding to 10% of the lens effective diameter and r49 is a local radius of curvature in a diameter corresponding to 90% of the lens effective diameter.

19. The zoom lens according to claim 15, wherein the following relationship is satisfied:

$$0.8 < BF/fw < 1.7,$$

where fw is a composed focal length of the entire system at a wide-angle end and BF is an air distance between the end surface of the lens and the image plane.

20. The zoom lens according to claim 15, wherein a radius of curvature of the surface of a lens disposed closest to the image plane side in the first lens group and a radius of curvature of the surface of a lens disposed closest to the object side in the second lens group have the same value.

21. The zoom lens according to claim 15, wherein the negative lens of the cemented lens of the second lens group satisfies a relationship:

$$|\{sag(r1) - sag(r2) - d8\}/d8| < 4.5,$$

where sag (r1) denotes a sag amount between the center of the lens on the incident surface of the negative lens of the cemented lens and the position where the incident surface of the negative lens of the cemented lens is brought into contact with the outgoing surface of the negative lens disposed closest to the object side of the second lens group; sag (r2) denotes a sag amount between the center of the lens and the outer-most peripheral portion on the outgoing surface on the negative lens of the cemented lens; and d8 denotes a thickness of a lens.

22. A zoom lens comprising, a first lens group having a positive refracting power that is fixed, a second lens group having a negative refracting power and varying power by moving along an optical axis, a third lens group having a positive refracting power that is fixed, and a fourth lens group having a positive refracting power and moving along the optical axis so that it keeps an image plane following up the movement of the second lens group and an object at a constant position with respect to a standard plane, the first, second, third and fourth lens groups being disposed from a side near the object to a side far away from the object in this order;

wherein the first lens group comprises a negative lens, a positive lens, and a positive lens having a convex surface facing the object side, disposed from the object side in this order; the second lens group comprises a negative lens and a cemented lens of a negative lens and a positive lens in which the negative lens is located at the object side, disposed from the object side in this order, wherein at least one surface of the lenses is an aspherical surface; the third lens group comprises a positive lens having a convex surface facing the object side, a positive lens and a negative meniscus lens having a convex surface facing the object side, disposed from the object side in this order, wherein at least one surface of the lenses is an aspherical surface, and the fourth lens group comprises a cemented lens of a negative lens and a positive lens in which the negative lens is located at the object side, wherein at least one surface of the lens has an aspherical surface; and the following relationships are satisfied:

$$9.0<f1/fw<10.5$$

$$1.2<|f2/fw|<1.6$$

$$4.5<f3/fw<6.0$$

$$4.0<f4/fw<5.5$$

where f1 is a composed focal length of the first lens group, f2 is a composed focal length of the second lens group, f3 is a composed focal length of the third lens group, f4 is a composed focal length of the fourth lens group, and fw is a composed focal length of the entire system at a wide-angle end.

23. The zoom lens according to claim 22, wherein an aspherical lens of the second lens group satisfies a relationship:

$$0.6<r21/r29<1.3,$$

where r21 is a local radius of curvature in a diameter corresponding to 10% of the lens effective diameter and r29 is a local radius of curvature in a diameter corresponding to 90% of the lens effective diameter.

24. The zoom lens according to claim 22, wherein an aspherical lens of the third lens group satisfies a relationship:

$$0.3<r31/r39<1.9,$$

where r31 is a local radius of curvature in a diameter corresponding to 10% of the lens effective diameter and r39 is a local radius of curvature in a diameter corresponding to 90% of the lens effective diameter.

25. The zoom lens according to claim 22, wherein an aspherical lens of the fourth lens group satisfies a relationship:

$$0.5<r41/r49<1.1,$$

where r41 is a local radius of curvature in a diameter corresponding to 10% of the lens effective diameter and r49 is a local radius of curvature in a diameter corresponding to 90% of the lens effective diameter.

26. The zoom lens according to claim 22, wherein the following relationship is satisfied:

$$0.8<BF/fw<1.7,$$

where fw is a composed focal length of the entire system at a wide-angle end and BF is an air distance between the end surface of the lens and the image plane.

27. The zoom lens according to claim 22, wherein a radius of curvature of the surface of a lens disposed closest to the image plane side in the first lens group and a radius of curvature of the surface of a lens disposed closest to the object side in the second lens group have the same value.

28. The zoom lens according to claim 22, wherein the negative lens of the cemented lens of the second lens group satisfies a relationship:

$$|\{sag(r1)-sag(r2)-d8\}/d8|<4.5,$$

where sag (r1) denotes a sag amount between the center of the lens on the incident surface of the negative lens of the cemented lens and the position where the incident surface of the negative lens of the cemented lens is brought into contact with the outgoing surface of the negative lens disposed closest to the object side of the second lens group; sag (r2) denotes a sag amount between the center of the lens and the outer-most peripheral portion on the outgoing surface on the negative lens of the cemented lens; and d8 denotes a thickness of a lens.

29. A video camera using the zoom lens defined in claim 1.

* * * * *